(12) United States Patent
Bosworth et al.

(10) Patent No.: US 10,717,190 B2
(45) Date of Patent: Jul. 21, 2020

(54) END-EFFECTOR FOR WORKPIECE MANIPULATION SYSTEM

(71) Applicant: Aurora Flight Sciences Corporation, Manassas, VA (US)

(72) Inventors: William Bosworth, Cambridge, MA (US); Thomas Needham, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 251 days.

(21) Appl. No.: 15/957,732

(22) Filed: Apr. 19, 2018

(65) Prior Publication Data

US 2019/0321971 A1 Oct. 24, 2019

(51) Int. Cl.
| | |
|---|---|
| *B64D 1/22* | (2006.01) |
| *B64C 39/02* | (2006.01) |
| *B25J 9/16* | (2006.01) |
| *B25J 15/00* | (2006.01) |
| *B25J 9/10* | (2006.01) |

(52) U.S. Cl.
CPC ............. *B25J 9/162* (2013.01); *B25J 9/1065* (2013.01); *B25J 9/1602* (2013.01); *B25J 15/0028* (2013.01); *B64C 39/024* (2013.01); *B64D 1/22* (2013.01); *B64C 2201/024* (2013.01); *B64C 2201/128* (2013.01); *Y10S 901/01* (2013.01);
(Continued)

(58) Field of Classification Search
CPC .......... B64D 1/00; B64D 1/12; B64C 39/024; B64C 2201/027; B64C 2201/12; B64C 2201/128

USPC ........................................................ 244/137.4
See application file for complete search history.

(56) References Cited

U.S. PATENT DOCUMENTS

| | | | |
|---|---|---|---|
| 8,882,165 B2 | 11/2014 | Lipson et al. | |
| 9,280,038 B1 * | 3/2016 | Pan | F16M 11/22 |

(Continued)

FOREIGN PATENT DOCUMENTS

| | | | | |
|---|---|---|---|---|
| EP | 3505444 A1 * | 7/2019 | ............ | B64C 39/022 |
| EP | 3505445 A1 * | 7/2019 | ............ | B25J 9/1065 |

(Continued)

OTHER PUBLICATIONS

Brown, Eric, et al., "Universal robotic gripper based on the jamming of granular material," PNAS Nov. 2, 2010, vol. 107, No. 44, 18809-18814.
(Continued)

*Primary Examiner* — Christopher P Ellis
(74) *Attorney, Agent, or Firm* — Michael Stanley Tomsa; McAndrews, Held & Malloy, Ltd.; Eugene H. Nahm

(57) ABSTRACT

A workpiece manipulation system is disclosed. The workpiece manipulation system is configured to provide high-precision manipulation of a workpiece by an aircraft. The workpiece manipulation system comprises a lifting mechanism to couple with the aircraft, an end-effector, and a processor. The lifting mechanism includes one or more joint actuators to extend or retract the lifting mechanism relative to the aircraft. The end-effector includes an end-effector actuator to control an operation of the end-effector to manipulate the workpiece. The processor is communicatively coupled with an aircraft processor and configured to control operation of the end-effector actuator and the one or more joint actuators.

20 Claims, 18 Drawing Sheets

(52) U.S. Cl.
CPC ............ *Y10S 901/02* (2013.01); *Y10S 901/15* (2013.01); *Y10S 901/31* (2013.01)

(56) References Cited

U.S. PATENT DOCUMENTS

| | | | | |
|---|---|---|---|---|
| 9,487,356 | B1* | 11/2016 | Aggarwal | B64C 39/024 |
| 9,718,564 | B1* | 8/2017 | Beckman | B61L 23/04 |
| 10,336,543 | B1* | 7/2019 | Sills | G05D 1/0027 |
| 2003/0066373 | A1* | 4/2003 | Maeguchi | B25J 9/1065 74/490.01 |
| 2005/0275367 | A1* | 12/2005 | Buehler | B25J 9/102 318/568.12 |
| 2016/0159472 | A1* | 6/2016 | Chan | B64C 27/08 244/39 |
| 2016/0236346 | A1* | 8/2016 | Lee | B25J 9/10 |
| 2016/0377424 | A1* | 12/2016 | Clark | G01B 11/303 356/600 |
| 2017/0066138 | A1* | 3/2017 | Hawkes | B25J 15/008 |
| 2017/0233076 | A1* | 8/2017 | Grossman | B64D 37/04 244/137.4 |
| 2018/0079629 | A1* | 3/2018 | Abdallah | B25J 1/02 |
| 2018/0284760 | A1* | 10/2018 | Gupta | G06F 3/016 |
| 2018/0335372 | A1* | 11/2018 | Orol | G01N 1/08 |
| 2018/0337731 | A1* | 11/2018 | Taptic | H04B 10/25752 |
| 2018/0354625 | A1* | 12/2018 | Verkade | B64C 17/02 |
| 2018/0361595 | A1* | 12/2018 | Troy | B25J 13/088 |
| 2019/0043370 | A1* | 2/2019 | Mulhall | B64D 1/08 |
| 2019/0069496 | A1* | 3/2019 | Wofford | A01G 25/09 |
| 2019/0070772 | A1* | 3/2019 | Stone | B29C 53/043 |
| 2019/0077506 | A1* | 3/2019 | Shaw | G06Q 10/083 |
| 2019/0084670 | A1* | 3/2019 | Sharma | B64C 39/024 |
| 2019/0095687 | A1* | 3/2019 | Shaw | G06K 9/0063 |
| 2019/0127052 | A1* | 5/2019 | Chen | B64C 37/00 |
| 2019/0127064 | A1* | 5/2019 | Beardsley | B05B 13/005 |
| 2019/0161190 | A1* | 5/2019 | Gil | E05F 15/77 |
| 2019/0162358 | A1* | 5/2019 | Wang | F16M 11/18 |
| 2019/0166765 | A1* | 6/2019 | Maor | G06T 5/50 |
| 2019/0275683 | A1* | 9/2019 | Bright | B25J 15/0253 |
| 2019/0276140 | A1* | 9/2019 | Poltorak | B64C 39/024 |
| 2019/0311555 | A1* | 10/2019 | Troy | G06T 7/73 |
| 2019/0314990 | A1* | 10/2019 | Sugaki | B25J 13/089 |
| 2019/0321971 | A1* | 10/2019 | Bosworth | B25J 15/0266 |
| 2019/0348857 | A1* | 11/2019 | Dudar | B64C 39/024 |
| 2019/0373173 | A1* | 12/2019 | Wang | H04N 5/23258 |

FOREIGN PATENT DOCUMENTS

| | | | | |
|---|---|---|---|---|
| WO | WO-2017172932 A1 * | 10/2017 | ............ | G06F 21/12 |
| WO | WO-2017178898 A2 * | 10/2017 | ............ | B64C 39/024 |
| WO | WO-2018026285 A1 * | 2/2018 | ............ | B64C 39/024 |

OTHER PUBLICATIONS

Festo, FlexShaperGripper, Gripping modelled on a chameleon's tongue brochure, Festo AG & Co. KG, Germany.
Jamming Gripper brochure, Empire Robotics.

* cited by examiner

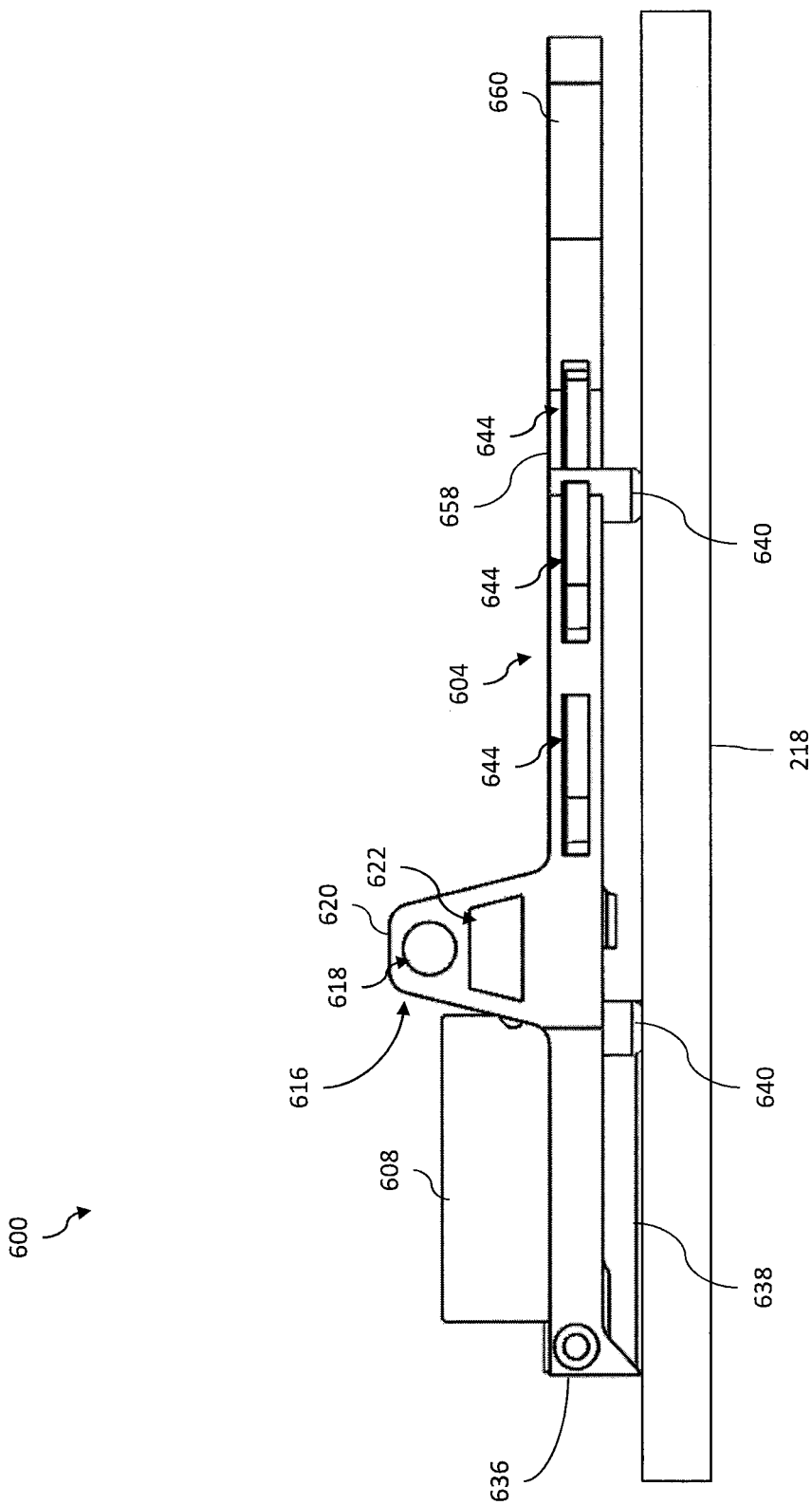

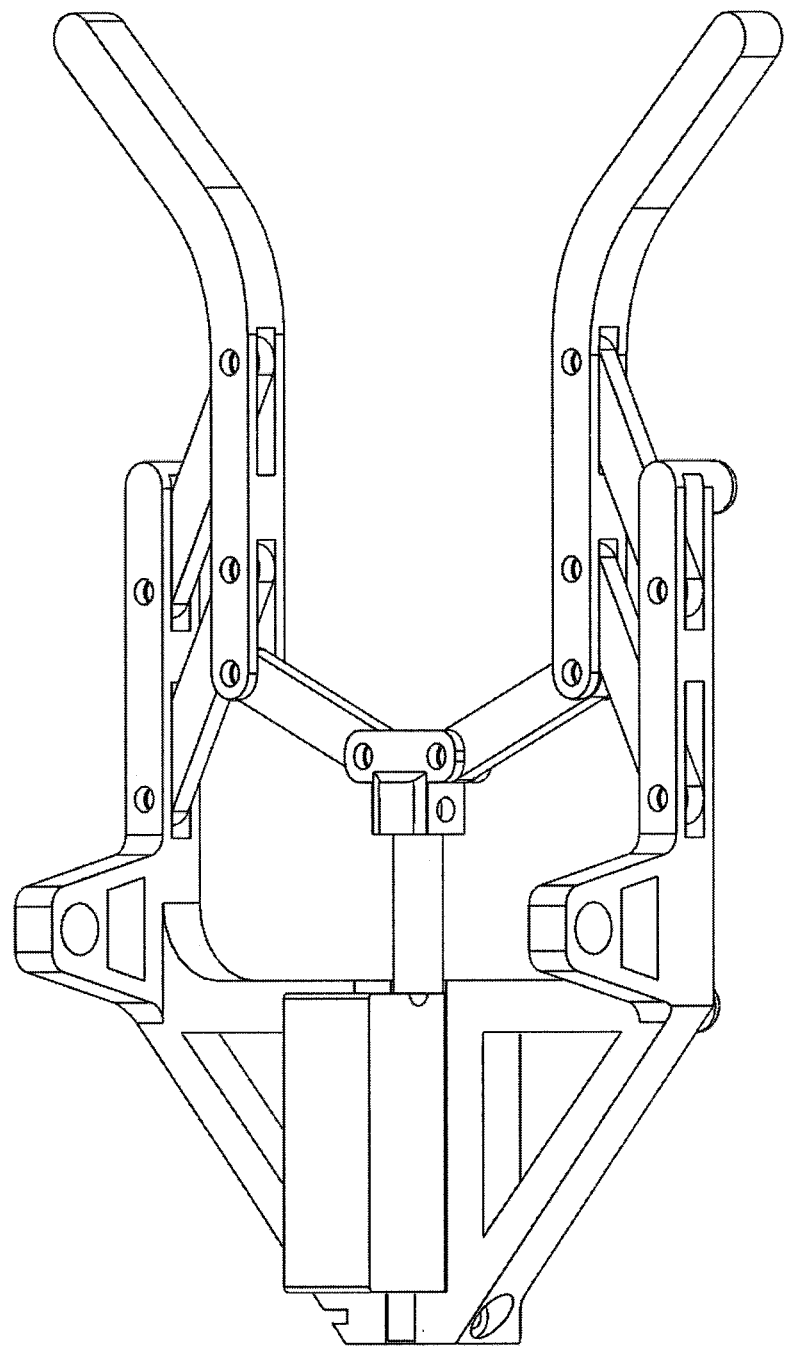

END-EFFECTOR FOR WORKPIECE MANIPULATION SYSTEM

TECHNICAL FIELD

The present disclosure relates to a workpiece manipulation system, and more particularly to an end-effector for the workpiece manipulation system.

BACKGROUND

In certain industries, precision grasping and/or manipulation of a workpiece is crucial. For example, wet-lab automation may require the ability to manipulate microplates (e.g., microtiter plates) with millimeter accuracy, which is traditionally performed with robot arms that are either bolted to the ground or placed on stiff linear rails. Other industries also rely on precision grasping and/or manipulation by automated and/or robotic mechanisms.

However, robotic manipulation is a difficult problem. It may require locating, tracking, and gripping an object in space. In some examples, robotic arms are used. While robotic arms have evolved, they still suffer from a number of shortcomings. For example, robotic arms are often costly, may occupy valuable facility real estate, and, because they may be limited to either being bolted to the floor or to riding on rails, a single facility may often require that multiple robotic arms be installed next to each other in order to service a continuous production line.

UAVs may be excellent candidates to replace traditional fixed robotic arms in warehouses, factories, and laboratories. For example, the UAVs may provide automation and/or transportation of workpieces within a given facility. Further, a UAV with perception and/or comparable transportation capability may be an order of magnitude cheaper than a high-precision robotic arm that may cost hundreds of thousands of dollars. Indeed, commercial low-cost UAV development is an active and growing industry. The current generation of low-cost commercial off-the-shelf (COTS) UAVs (i.e., consumer UAVs) is already capable of performing relatively safe indoor operation.

However, aerial robotic manipulation involves even more challenges than ground based robotic manipulation. With no fixed reference to operate a gripper from, an already tricky maneuver may be further complicated. Additionally, existing consumer UAVs suffer from aerodynamic instability and/or inaccuracy, which may make such UAVs incapable of precision grasping and manipulation. Indeed, modern consumer UAVs hover with a precision of approximately tens of centimeters, which can also be strongly affected by proximity to walls and tables, arm motion, and mechanical interaction between the arm and the environment.

SUMMARY

The present disclosure relates to a workpiece manipulation system, and more particularly to an end-effector for the workpiece manipulation system.

According to a first aspect, a workpiece manipulation system comprises: an airframe having a controller; a lifting mechanism coupled to the airframe, wherein the lifting mechanism includes one or more joint actuators to extend or retract the lifting mechanism relative to the airframe; an end-effector coupled to the lifting mechanism, wherein the end-effector comprises: a base, an actuator positioned on the base, wherein the actuator is configured to move a shaft between an extended position and a retracted position, and a gripper coupled to the shaft, wherein the gripper comprises first and second legs, wherein the first and second legs are spaced to define a gripping area therebetween, and wherein movement of the shaft causes movement of the first and second legs to expand or contract the gripping area.

In certain aspects, the workpiece manipulation system further comprises first and second parallel bars coupled to the base, wherein the first and second legs reside in substantially the same plane as the first and second parallel bars, wherein the first and second legs are positioned between the first and second parallel bars.

In certain aspects, the first and second parallel bars are coupled to one or more couplers, wherein the one or more couplers are coupled to the lifting mechanism.

In certain aspects, the first parallel bar includes a first shoulder having a first aperture and the second parallel bar includes a second shoulder having a second aperture that is axially aligned with the first aperture, and wherein a lifting mechanism is configured to couple to the end-effector via the first aperture and the second aperture.

In certain aspects, the workpiece manipulation system further comprises a foot connected to an underside of the base to provide ground clearance for the end-effector.

In certain aspects, the workpiece manipulation system further comprises a seat formed in the base, wherein the actuator is positioned within the seat.

In certain aspects, the actuator is configured move the shaft to change a position of the shaft when receiving power from the power source, and wherein the actuator is configured to maintain the position of the shaft when the actuator does not receive power from the power source.

In certain aspects, the gripper is coupled to the shaft at a hip, and wherein the hip is pivotally coupled to the first and second legs.

In certain aspects, the first leg comprises a first limb and a first forelimb pivotally coupled to one another at a first knee, and wherein the second leg comprises a second limb and a second forelimb pivotally coupled to one another at a second knee.

In certain aspects, each forelimb includes grip improving features to improve a grip of the forelimb.

In certain aspects, the first forelimb comprises a first stem portion and a first mouth portion, wherein the second forelimb comprises a second stem portion and a second mouth portion, wherein the first and second stem portions extend substantially parallel to one another and the first and second mouth portions extend away from each other, thereby defining a funnel shaped gripping area.

In certain aspects, the first stem portion is pivotally connected to the first parallel bar via a first link, wherein the second stem portion is pivotally connected to the second parallel bar via a second link.

In certain aspects, the first forelimb and the second forelimb are pushed towards each other by the first and second links when the shaft is retracted, thereby narrowing the gripping area between the first and second legs, and wherein the first forelimb and second forelimb are pulled away from each other by the first and second links when the shaft is extended, thereby widening the gripping area between the first and second legs.

In certain aspects, the controller is configured to control the actuator and to maneuver the end-effector within proximity of a workpiece via the lifting mechanism while using one or more impedance control techniques.

According to a second aspect, a method of manipulation comprises: identifying a workpiece; maneuvering an end-effector within proximity of the workpiece; opening, via an actuator coupled to a shaft, a gripper of the end-effector to expand a gripping area, wherein the gripper comprises first and second legs, wherein the first and second legs are spaced to define a gripping area therebetween, and wherein linear movement of the shaft is configured to move the first and second legs relative to one another to expand or contract the gripping area; maneuvering the gripper such that the workpiece is at least partially within the gripping area; and closing the gripper, via the actuator, to constrict the gripping area and grasp the workpiece.

In certain aspects, an aerial vehicle maneuvers the end-effector within proximity of the workpiece.

In certain aspects, the aerial vehicle retains the end-effector in a stowed position until the end-effector is in proximity of the workpiece.

DESCRIPTION OF THE DRAWINGS

The foregoing and other objects, features, and advantages of the devices, systems, and methods described herein will be readily understood from the following description of particular embodiments thereof, as illustrated in the accompanying figures, where like reference numbers refer to like structures. The figures are not necessarily to scale, emphasis instead being placed upon illustrating the principles of the devices, systems, and methods described herein.

FIG. 1b illustrates a block diagram of an example aircraft control system for the VTOL UAV of FIG. 1a.

FIG. 6b illustrates a side view of the example end-effector of FIG. 6a, according to an aspect of the present disclosure.

FIGS. 7a through 7c illustrate movement of the example end-effector of FIG. 6a between a closed position and an open position.

DETAILED DESCRIPTION

Figure 1A:
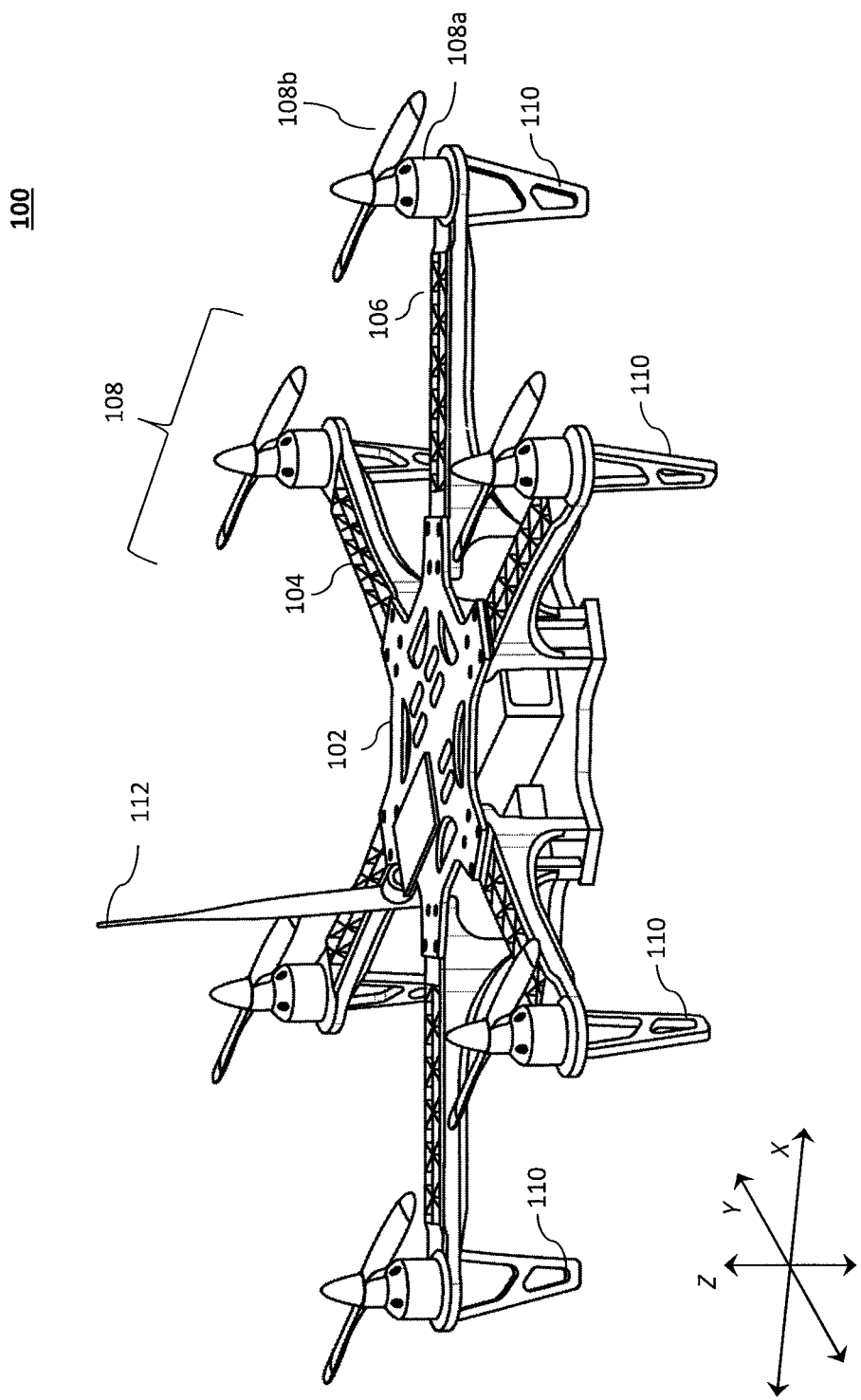
FIG. 1a illustrates an example multi-rotor vertical take-off and landing (VTOL) UAV.

Preferred embodiments of the present disclosure will be described herein below with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same or similar reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like, are words of convenience and are not to be construed as limiting terms. The various data values (e.g., voltages, seconds, etc.) provided herein may be substituted with one or more other predetermined data values and, therefore, should not be viewed limiting. For this application, the following terms and definitions shall apply:

The terms "aerial vehicle" and "aircraft" refer to a machine capable of flight, including, but not limited to, fixed wing aircraft, unmanned aerial vehicle, variable wing aircraft, and vertical take-off and landing (VTOL) aircraft.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The terms "coupled," "coupled to," and "coupled with" as used herein, each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect," means to attach, affix, couple, join, fasten, link, and/or otherwise secure. As used herein, the term "anchor" means to attach, affix, connect, couple, join, fasten, link, and/or otherwise secure.

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The term "data" as used herein means any indicia, signals, marks, symbols, domains, symbol sets, representations, and any other physical form or forms representing information, whether permanent or temporary, whether visible, audible, acoustic, electric, magnetic, electro-magnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "operatively coupled" means that a number of elements or assemblies are coupled together, such that as a first element/assembly moves from one state (and/or configuration, orientation, position etc.) to another, a second element/assembly that is operatively coupled to the first element/assembly also moves between one state (and/or configuration, orientation, position etc.) to another. It is noted that a first element may be "operatively coupled" to a second element without the opposite being true.

The term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

A need exists for a UAV equipped with an arm and end-effector that is capable of high-precision manipulation, transportation, and/or emplacement of workpieces in an environment (e.g., an indoor environment). A need also exists for a workpiece manipulation system capable of retrofitting an UAV to compensate for such aerodynamic instability and inaccuracy to provide increase endpoint-accuracy. As will be disclosed.

Disclosed herein is an example of an end-effector for a workpiece manipulation system. The workpiece manipulation system enhances effective endpoint-accuracy of a UAV and constrains how mechanical forces caused by interaction between an end-effector and a surrounding environment reflect back onto the flight dynamics of the UAV. For example, the workpiece manipulation system may also enhance the effective endpoint-accuracy of the UAV by controlling how mechanical forces (e.g., those caused by interaction between an end-effector and a surrounding environment) reflect back onto the flight dynamics of the UAV. The end-effector further addresses the influence of mobile references, randomly oriented objects, and relatively uncontrolled approaches to those objects on workpiece manipulation systems. The end-effector is also compatible with common flight requirements (e.g., low weight, minimal power, fault tolerance). The end-effector may use a lightweight parallel bar design that pulls the target "in" towards the pivot point as it closes. The end-effector may work with controlled-impedance arms on UAVs. The controlled-impedance arm design may mitigate the unpredictability of the UAV floating platform and may also be tolerant to crashes, misalignment with the target, effects from rotor wash and/or interaction with a ground surface.

In some examples, the end-effector may be deployed from the UAV by an arm that maintains mechanical connection and that may shape and/or actively control its mechanical impedance to act as a low-pass motion filter—i.e., a mechanical suspension—that seeks to decouple UAV inaccuracy and drift from the end-effector's movement with respect to a target object. The end-effector may travel in contact with the same surface as the target to provide a "ground reference" functionally between both. Many features aide positive engagement, such as the "funnel" shaped arms to align the target, standoffs (e.g., a foot or set of feet) on the bottom of the frame to keep proper ground clearance, and an unbalanced center of gravity (CG) that causes the end-effector to land "ankle first", thereby preventing snags with the ground. The simple actuation method also reduces control complexity and power/weight budgeting. Additionally, the actuator may be configured to hold its position when powered off, and the mechanical linkage may guarantee proper closing/opening from only one actuating drive.

An end-effector used in the workpiece manipulation system may have the following characteristics: (1) The gripper may be relatively lightweight so as to provide a load capable of being carried by a commercial UAV. (2) The gripper may be tolerant to position errors with respect to grasping its target object so as to grasp accurately in a six dimensional environment. (3) The gripper may be energy efficient and may require no power after grasping. (i.e., it may not be back-driveable, so the target object can be held with no motor power). (4) The gripper may be simple to control. This is related to the low-precision of the UAV platform, but also the general requirement of making a simple system.

A suitable aircraft for use with a workpiece manipulation system includes the multi-rotor VTOL UAV 100 illustrated in FIG. 1a. As illustrated, the UAV 100 generally comprises an airframe 102 (e.g., a fuselage or other structure), a plurality of rotor booms 104 (e.g., longitudinal booms) extending radially from the airframe 102, landing gear 110, and a plurality of propulsors 108. While a multi-rotor VTOL UAV is illustrated throughout the figures, the teachings of the present disclosure may similarly be applied to other aircraft, including fixed wing aircraft.

The airframe 102 may be coupled with a proximal end of each of the plurality of rotor booms 104 such that the distal ends of the plurality of rotor booms 104 extend radially from the airframe 102. The airframe 102 and the plurality of rotor booms 104 may be fabricated as a singular unit, or as separate components to be coupled to one another. The distal end of each of the plurality of rotor booms 104 may be coupled with a propulsor 108, each of which is illustrated as a lift motor 108a coupled to, and configured to drive/rotate, a propeller 108b. Each of said plurality of propulsors 108 is placed at a distal end of a rotor boom 104 and oriented to direct thrust downward (relative to the airframe 102). The lift motor 108a may be an electric motor controlled via an electronic speed controller (ESC) 106. To that end, an ESC 106 may also be provided, for example, adjacent the lift motor 108a and integrated (or otherwise coupled) at the distal end of a rotor boom 104. While the UAV 100 is illustrated as having six propulsors 108 (i.e., an hexa-rotor aircraft), a person of skill in the art would understand that additional, or fewer, propulsors 108 may be employed to achieve a desired function and depending on, for example, thrust requirements.

While the lift motors 108a are illustrated at the distal end of each boom 104, the lift motors 108a (or a single lift motor 108a) may instead be positioned at the airframe 102 and configured to drive (rotate) one or more propellers 108b via a gearbox and/or a driveshaft between the lift motor 108a and the one or more propellers 108b. Further, while each boom 104 is illustrated as having only a single propulsor 108, multiple propulsors 108 may be provided at the distal end of each boom 104. For example, a cross-member may be positioned at the distal end of each boom 104 and arranged to space the propulsors 108 from one another (e.g., perpendicularly to the length of the boom 104) or to otherwise prevent interference between propellers 108b (e.g., a staggered/overlapping configuration). The components of the UAV 100 may be fabricated from metal, a composite material, or a combination thereof. To prevent mechanical interference with the workpiece manipulation system, the landing gear 110 may comprise a plurality of posts positioned along the perimeter of the UAV 100 (e.g., at the distal end of each boom). The posts of landing gear 110 and the plurality of rotor booms 104 may be fabricated as a singular unit, or as separate components to be coupled to one another.

Figure 1B:
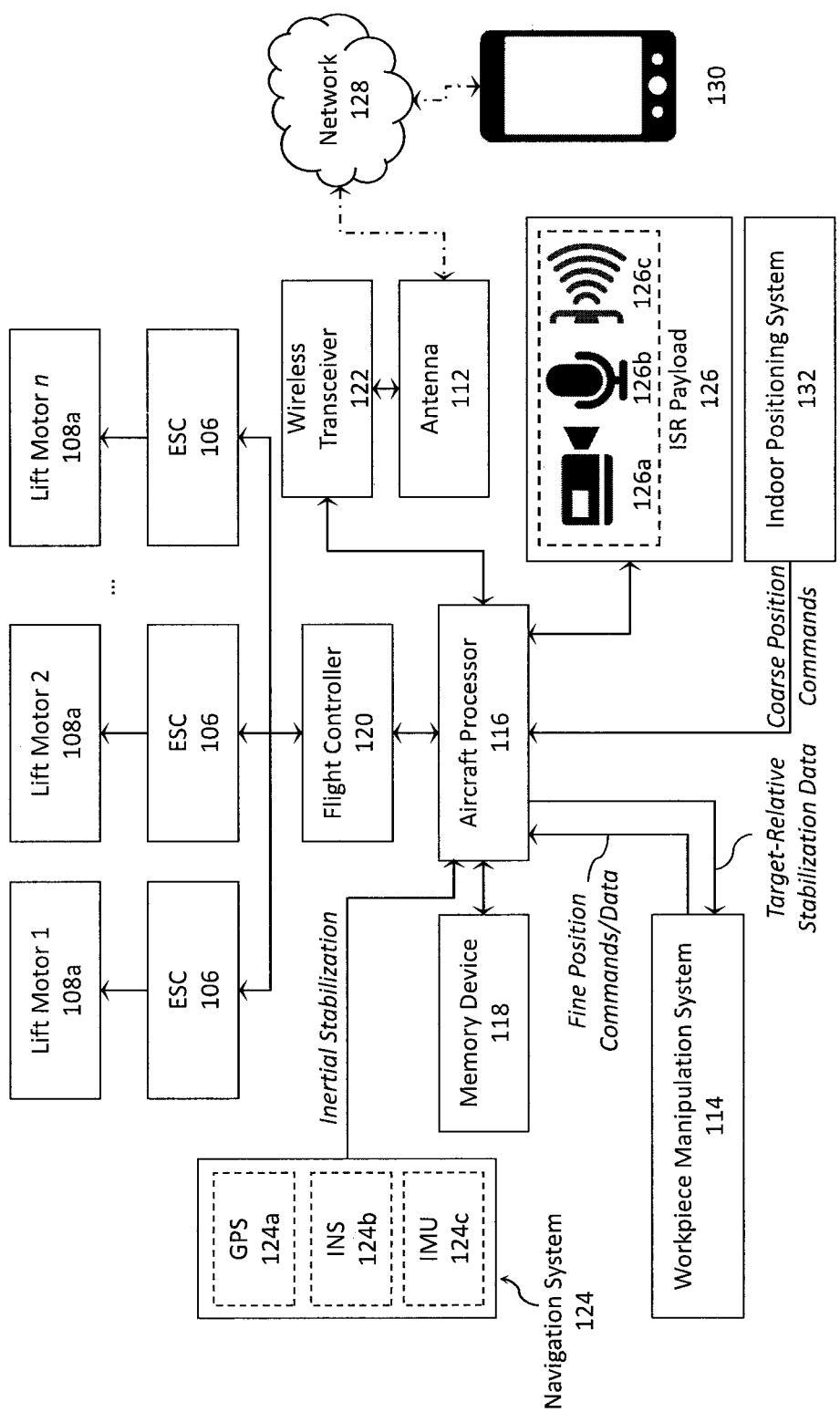

FIG. 1b illustrates a block diagram of an example aircraft control system for the UAV 100. The aircraft control system is configured to control the various aircraft components and functions of the UAV 100. As illustrated, the UAV 100 includes one or more aircraft processors 116 communicatively coupled with at least one memory device 118, a workpiece manipulation system 114, a flight controller 120, a wireless transceiver 122, and a navigation system 124. The aircraft processor 116 may be configured to perform one or more operations based at least in part on instructions (e.g., software) and one or more databases stored to the memory device 118 (e.g., hard drive, flash memory, or the like).

The aircraft control system may further include other desired services, such as a wireless transceiver 122 coupled with an antenna 112 to communicate data between the UAV 100 and a remote device 130 (e.g., portable electronic devices, such as smartphones, tablets, and laptop computers) or other controller (e.g., a base station). For example, the UAV 100 may communicate data (processed data, unprocessed data, etc.) with the remote device 130 over a network 128. In certain aspects, the wireless transceiver 122 may be configured to communicate using one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. The remote device 130 may facilitate monitoring and/or control of the UAV 100 and its payload(s), including the workpiece manipulation system 114 and ISR payload 126.

The aircraft processor 116 may be operatively coupled to the flight controller 120 to control operation of the various actuators (e.g., those to control movement of any flight surfaces) and/or lift motor 108a (e.g., via ESC 106) in response to commands from an operator, autopilot, a navigation system 124, or other high-level system via the wireless transceiver 122. In certain aspects, the aircraft processor 116 and the flight controller 120 may be integrated into a single component or circuit. In operation, the flight controller 120 may dynamically (i.e., in real-time or near real-time) and independently adjust thrust from each of the lift motors 108a on each rotor boom 104 during the various stages of flight (e.g., take-off, cruising, landing) via the ESC 106 to control roll, pitch, or yaw of the UAV 100. In other words, the flight controller 120 can independently control each of the lift motors 108a on a given rotor boom 104 to generate a desired lift thrust for each of the lift motors 108a. For example, when rotors with rotor blades (e.g., propellers) are used, the flight controller 120 may vary the revolutions per minute (RPM) of the rotor and/or, where desired, vary the pitch of the rotor blades. Specifically, the lift motors 108a may be controlled by adjusting power supplied to each electric motor from a power supply (e.g., a battery pack or a battery bank) via the ESC 106.

The aircraft processor 116 may be operatively coupled to the navigation system 124, which may include a global positioning system (GPS) 124a that is communicatively coupled with an Inertial Navigation System (INS) 124b and/or an inertial measurement unit (IMU) 124c, which can include one or more gyros and accelerometers. The GPS 124a gives an absolute drift-free position value that can be used to reset the INS solution or can be blended with it by use of a mathematical algorithm, such as a Kalman Filter. The navigation system 124 may communicate, inter alia, inertial stabilization data to the aircraft processor 116, which may be used to facilitate operation of the workpiece manipulation system 114.

To collect data and/or monitor an area, the UAV 100 may further be equipped with an intelligence, surveillance, and reconnaissance (ISR) payload 126 comprising, for example, one or more cameras 126a (e.g., an optical instrument for recording or capturing images and/or video, including light detection and ranging (LIDAR) devices), audio devices 126b (e.g., microphones, echolocation sensors, etc.), and other sensors 126c to facilitated ISR functionality and provide ISR data (e.g., photographs, video, audio, sensor measurements, etc.). The ISR payload 126 is operatively coupled to the aircraft processor 116 to facilitate communication of the ISR data between the ISR payload 126 and the aircraft processor 116. The ISR data may be used to navigate the UAV 100 and/or control operation of the workpiece manipulation system 114. The ISR payload 126 may be rotatably and pivotally coupled to, for example, the underside surface of the airframe 102 (or another structural component, such as the rotor booms 104) via a gimbal system to enable the ISR payload 126 to be more easily oriented downward to monitor objects below and/or on the ground. The data may be dynamically or periodically communicated from the UAV 100 to the remote device 130 over the network 128 via the wireless transceiver 122, or stored to the memory device 118 for later access or processing.

The aircraft processor 116 may be operatively coupled with an indoor positioning system 132, which measures UAV 100 position within an environment based on sensor readings and/or known navigational maps (e.g., a map of the environment reflecting obstacles and/or boundaries), which may be loaded and stored to the UAV 100 (e.g., at the memory device 118). The indoor positioning system 132 may include, or be communicatively coupled with, various sensors, such as motion capture sensors, radio-beacons, infrared sensors, acoustic sensors, etc. In certain aspects, the indoor positioning system 132 may employ ISR data from the ISR payload 126 to determine the UAV 100 position within an environment.

The aircraft processor 116 may be operatively coupled with the workpiece manipulation system 114 to provide two-way communication between the workpiece manipulation system 114 (e.g., its processor and/or sensors) and the aircraft processor 116. In operation, the aircraft processor 116 may communicate target-relative stabilization data to the workpiece manipulation system 114 and receive from the workpiece manipulation system 114 fine position commands/data. For example, commands may be communicated to the workpiece manipulation system 114 from the aircraft processor 116 based at least in part on commands from an operator, autopilot, the navigation system 124, the indoor positioning system 132, the ISR payload 126, or other high-level systems. Further, the normal positioning and attitude/rate inputs to the flight controller 120 can be augmented by the aircraft processor 116 as finer-scale inputs based at least in part on feedback from the workpiece manipulation system's 114 contact with surfaces (e.g. measurement of interaction force) and position sensing of the workpiece to be grasped and emplaced.

Figure 2A:
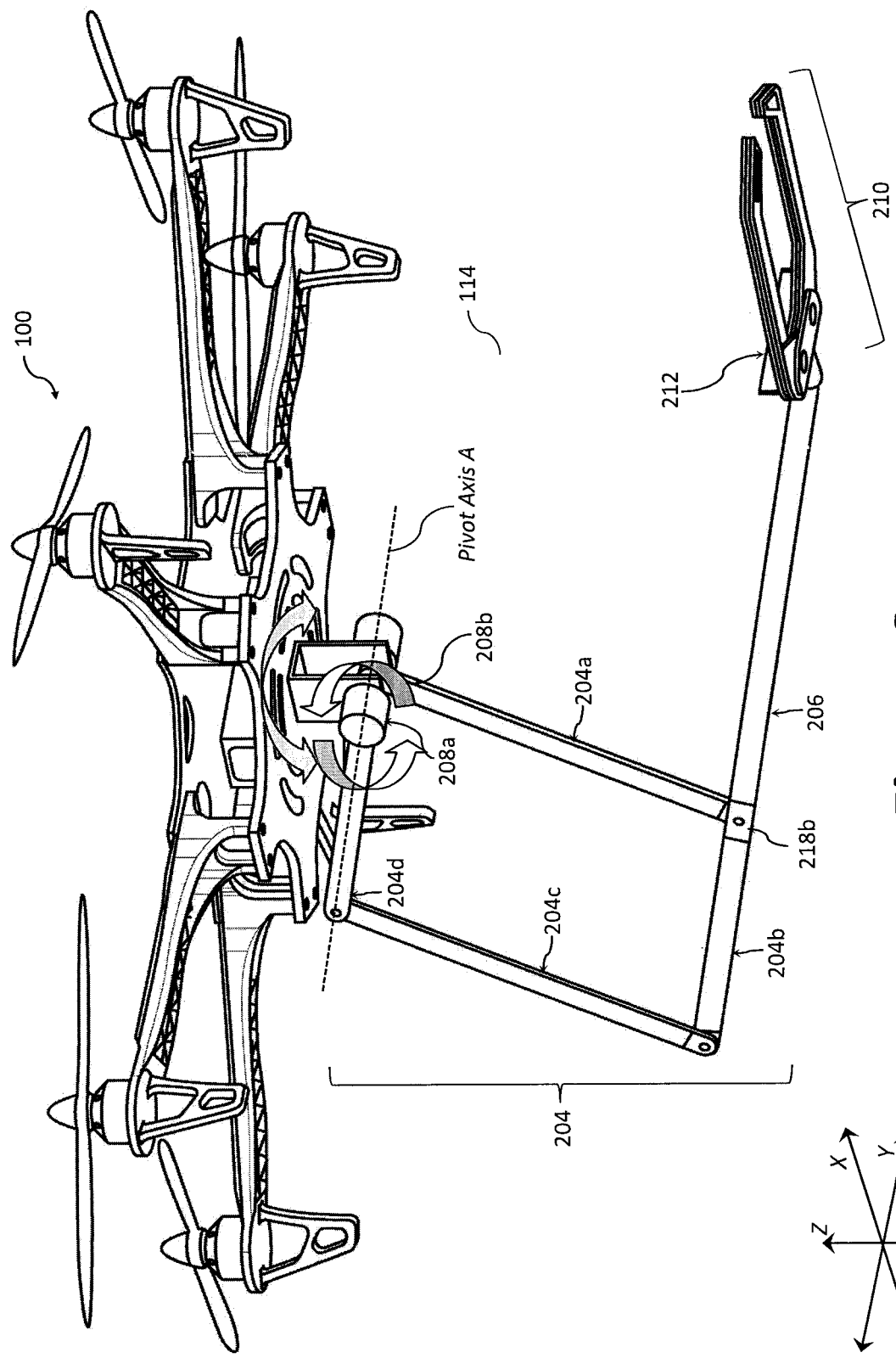
FIGS. 2a through 2c illustrate the UAV of FIG. 1a equipped with an example workpiece manipulation system.
Figure 2B:
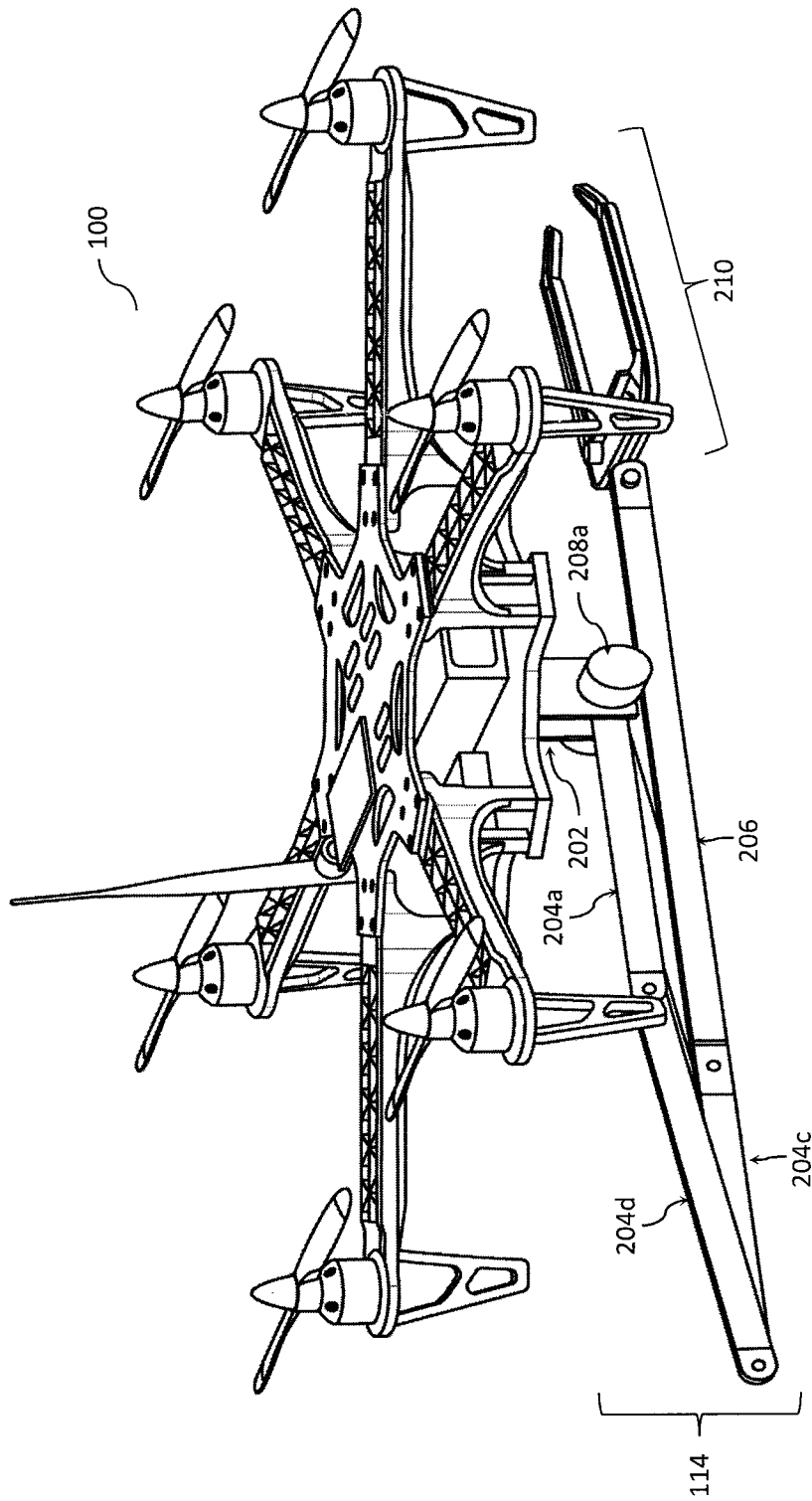
Figure 2C:
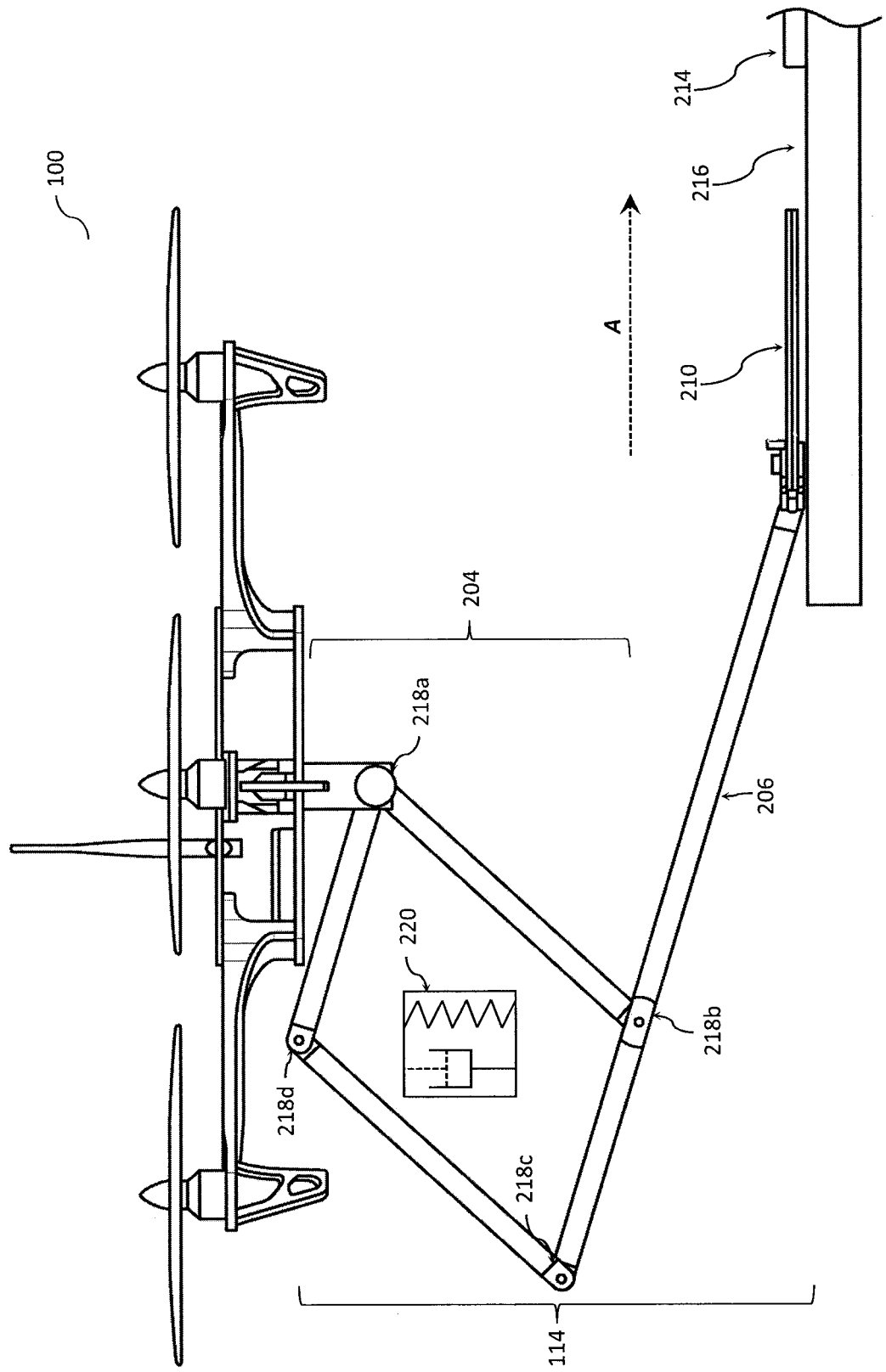

A UAV 100 equipped with an example workpiece manipulation system 114 is illustrated in FIGS. 2a through 2c. Specifically, FIG. 2a illustrated the workpiece manipulation system 114 in an extended position, while FIG. 2b illustrates the workpiece manipulation system 114 is in the stowed position (e.g., as the UAV 100 navigates to a waypoint) and FIG. 2c illustrates a side view of contact between the end-effector 210 and a stable surface 216. The workpiece manipulation system 114 generally comprises a mounting structure 202, a lifting mechanism 204, an arm boom 206, one or more joint actuators 208, and an end-effector 210. As illustrated, the workpiece manipulation system 114 may be rotatably and pivotally coupled to the UAV 100 via the mounting structure 202, which is coupled to the underside surface of the airframe 102. The mounting structure 202 may be fixed or configured to rotate relative to the airframe 102 (e.g., about an axis that is perpendicular to the X-Y plane). The mounting structure 202 may be, for example, a gimbal system or a U-shaped bracket.

The lifting mechanism 204 is illustrated as a four-bar linkage, which is a movable closed chain linkage having four bodies (e.g., linkage bars 204a, 204b, 204c, 204d) connected in a loop by four joints (e.g., linkage joints 218a, 218b, 218c, 218d). Specifically, as illustrated, the first linkage joint 218a pivotally couples the first linkage bar 204a to the fourth linkage bar 204d. The second linkage joint 218b pivotally couples the first linkage bar 204a to the second linkage bar 204b. The third linkage joint 218c pivotally couples the second linkage bar 204b to the third linkage bar 204c. Finally, the fourth linkage joint 218d pivotally couples the third linkage bar 204c to the fourth linkage bar 204d. Each linkage joint may employ, for example, a pivot pin secured by one or more pin holes or slots.

The four-bar linkage may be a planar four-bar linkage where the linkage joints are configured such that the linkage bars 204a, 204b, 204c, 204d move in the same (or parallel) planes. While the lifting mechanism 204 is illustrated as a four-bar linkage, additional linkage bars may be provided to mitigate jamming or binding of the lifting mechanism 204 as it traverses throughout a full range of motion. For example, a fifth linkage bar may be pivotally connected to the second and fourth linkage bars 204b, 204d via a pair of toggles such that the fifth linkage bar is parallel to the first and third linkage bars 204a, 204c.

The end-effector 210 may be coupled to the lifting mechanism 204 via an arm boom 206, which may be coupled with the lifting mechanism 204 at the second linkage joint 218b. In certain aspects, the arm boom 206 and the second linkage bar 204b may be formed as a unitary structure. A function of the arm boom 206 is to increase the distance between the end-effector 210 and the lifting mechanism 204. To that end, the arm boom 206 may be a telescoping boom, which may employ an actuator assembly, such as a ball screw/nut assembly driven (e.g., adjusted in length) by an electric motor or other actuator. The various hardware, such as the mounting structure 202, the linkage bars 204a, 204b, 204c, 204d, and the arm boom 206, may be fabricated from one or more lightweight materials, including metals, metal alloys, plastics (e.g., 3d printed plastic), and/or composite materials. Most of the mass of the workpiece manipulation system 114 can be attributed to the joint actuators 208, which are positioned near the airframe 102 of the UAV 100.

A pair of joint actuators 208a, 208b may be coupled to the mounting structure 202 and the lifting mechanism 204 at the first linkage joint 218a to raise and lower the arm boom 206 (and the end-effector 210) relative to the airframe 102. For example, the first joint actuator 208a may be configured to drive the fourth linkage bar 204d such that it pivots at one end (i.e., the end adjacent the first linkage joint 218a) about the first linkage joint's 218a axis of rotation (identified as Pivot Axis A), while the second joint actuator 208b may be configured to drive the first linkage bar 204a such that it pivots at one end about the first linkage joint's 218a axis of rotation.

The joint actuators 208 may employ, for example, brushless DC back-driveable motors. In operation, the two joint actuators 208a, 208b may be independently controlled to raise and lower the end-effector 210 relative to the UAV 100 via the lifting mechanism 204, and to adjust the angle of the arm boom 206. To minimize reflected friction and inertia onto the lifting mechanism 204, the joint actuators 208 may use a small gear ratio (e.g., 10:1 or less). Each of the joint actuators 208a, 208b may include a motor drive circuit that is controlled by the workpiece manipulation processor 402. The joint actuators 208 may be driven by high-bandwidth current control, which enables the joint actuators 208 to approximate the behavior of ideal torque sources.

In some examples, the workpiece manipulation system 114 may employ direct-drive actuators and/or mechanical impedance control techniques. Direct-drive may refer to a motor configuration with no gear box and/or a motor configuration with a low gear ratio. In some examples, impedance control may also be achieved using series elastic actuators (SEAs) and/or one or more force sensors at a distal end. Because the lifting mechanism 204 is very rigid and has low-inertia, force control at the endpoint of the arm boom 206 (e.g., the end-effector 210) may be possible using only (or primarily) the inverse Jacobian of the lifting mechanism 204 to calculate endpoint force(s) to required motor torque (s) as a function of a kinematic configuration of the leg. This enables the workpiece manipulation system 114 to control the mechanical impedance of the lifting mechanism 204 by commanding motor torques in response to kinematic feedback of the lifting mechanism 204. For example, stiffness may be controlled by commanded force as a function of position displacement, while damping may be controlled by commanding force as a function of velocity displacement. In some examples, damping may be controlled by commanding force as a function of velocity of the limb or rate of change of the position displacement. Proper selection of arm impedance will enable the lifting mechanism 204 to control the contact and/or interaction properties of the end-effector 210 with respect to the workpiece 214. The arm impedance may also provide stabilizing forces to the UAV 100, which will reduce variations in UAV 100 position induced by air currents, measurement errors, and other disturbances.

The endpoint-accuracy of the workpiece manipulation system 114 can be greatly enhanced by exploiting contact between the end-effector 210 and the stable surfaces 216. For example, consider a workpiece 214 that is resting on a flat stable surface 216. Placing the end-effector 210 directly onto the workpiece 214 would require accurate positioning in six axes-three Cartesian and three rotational. The workpiece manipulation system 114, on the other hand, can explicitly contact the stable surface 216 before approaching the workpiece 214, thereby using the stable surface 216 to orient and stabilize three of the end-effector's 210 degrees of freedom (i.e., vertical displacement and two rotational degrees of freedom). Active feedback control can ensure constant contact with the stable surface 216 as the UAV 100 moves the final centimeters (identified as Direction A) towards the workpiece 214.

As illustrated in FIG. 2c, the workpiece manipulation system 114 can move an end-effector 210 relative to the UAV 100 and toward the workpiece 214 along a stable surface 216 (e.g., a table, or other static mechanical surface). The lifting mechanism 204 acts as a spring-damper suspension 220 to provide active feedback and to maintain contact between the lifting mechanism 204 and the stable surface 216 near the workpiece 214. The dynamic capability of the lifting mechanism 204 effectively acts as a spring-damper suspension 220 between the end-effector 210 and the UAV 100 to maintain contact between the end-effector 210 and the stable surface 216, while decoupling interaction forces at the end-effector 210 from the dynamics of the UAV 100.

Additional sensing in the lifting mechanism 204 and the end-effector 210 can provide the UAV 100 with information to localize itself with respect to the workpiece 214 and to navigate toward and grasp the workpiece 214. For example, as will be discussed, the end-effector 210 may be provided with a depth camera and/or one or more touch sensors to measure relative orientation of the end-effector 210 vis-à-vis the workpiece 214. Information from the one or more sensors reflecting, for example, the workpiece manipulation system's 114 kinematic state can be communicated to the aircraft processor 116 to provide information about the UAV's 100 precise position with respect to stable surfaces 216 and workpieces 214. This information enhances localization and navigation of the UAV 100 to enable precise grasping of the workpiece 214. Once the workpiece 214 is grasped by the end-effector 210, the lifting mechanism 204 may stabilize the workpiece 214 during transport to prevent, for example, any potential sloshing and spillage. For example, if the workpiece 214 is held with the arm boom 206 partially extended, the end of the arm boom 206 will have sufficient range of motion to actuate in order to minimize accelerations on the workpiece 214 as the UAV 100 moves through the environment. This stabilization control can be performed using, for example, a single spring-damper gain setting that is selected using optimization and does not actively read accelerometer data, or through active vibration identification and suppression by reading accelerometer data on the UAV 100 and/or the workpiece 214. In one example, the lifting mechanism 204 may assume the stowed position of FIG. 2b, whereby the lifting mechanism 204 and/or the end-effector 210 is secured in place. This stowed configuration brings the arm boom 206 and workpiece 214 close to the UAV's center of mass, which provides the UAV 100 with the most favorable flight dynamics.

The end-effector 210 is the part of the workpiece manipulation system 114 that interacts with the workpiece 214 and the environment. Suitable end-effectors 210 for manipulation, transportation, and emplacement of workpieces 214 include grippers, magnets, and vacuum cups. For example, where the UAV 100 needs to pick up the workpiece 214, a gripper may be employed as an end-effector 210. Where the UAV 100 must perform other manufacturing operations, the end-effector 210 may include tools such as brushes, cutting tools, drills, sanders, screwdrivers, spray guns, and welding guns. The end-effector 210 may further include other devices to monitor the environment, such as anti-collision sensors and cameras.

Figure 3:
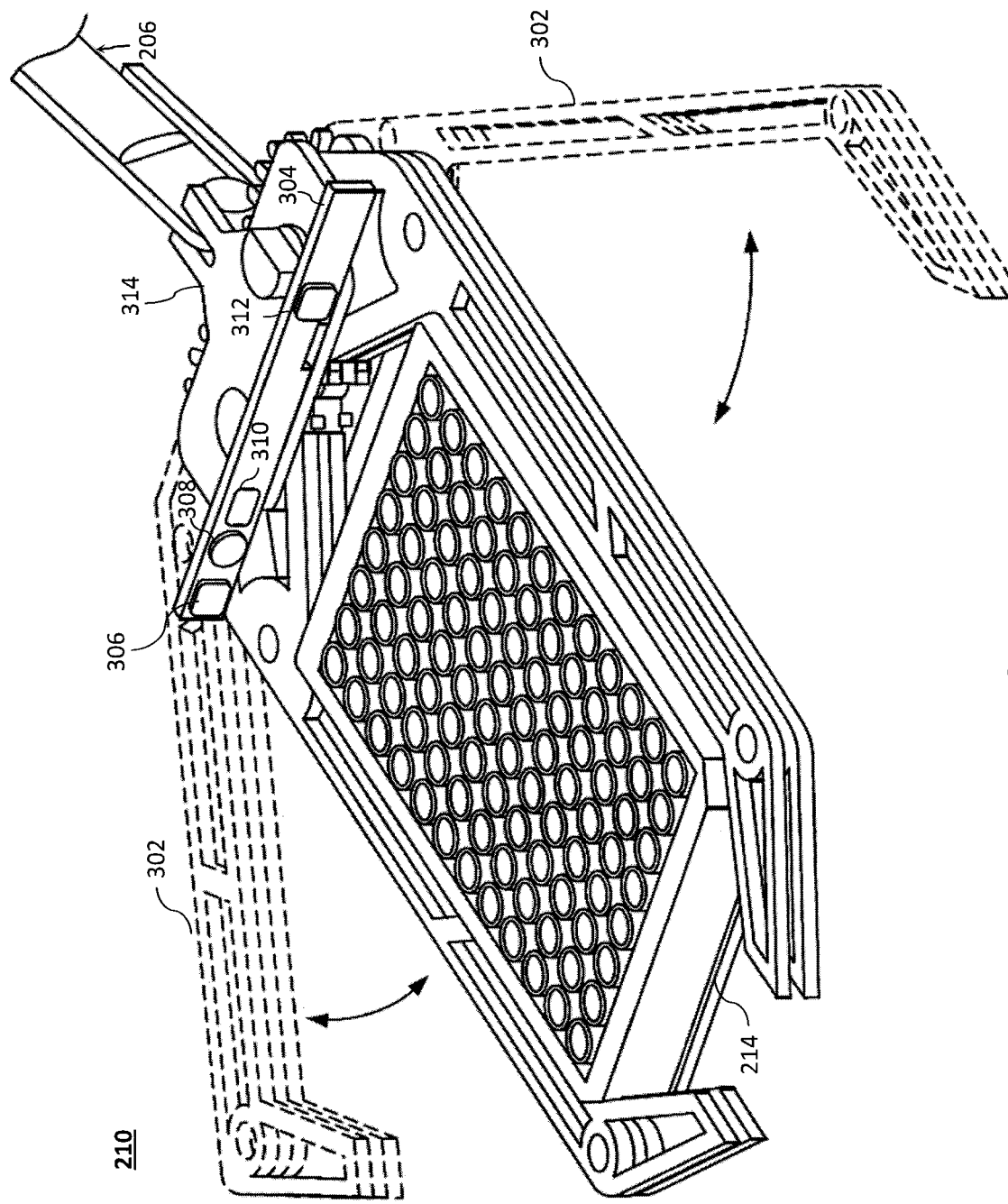
FIG. 3 illustrates an example end-effector to grasp a workpiece physically.

FIG. 3 illustrates an example end-effector 210 configured as a gripper to physically and reliably grasp a workpiece 214. As illustrated, the end-effector 210 generally comprises a base 314 and a set of finger members 302 pivotally attached to the base 314, where the base 314 pivotally couples with the arm boom 206. The end-effector 210 includes one or more end-effector actuators 212 to control the finger members 302 selectively. For example, each of the finger members 302 may include gearing teeth at one end (e.g., where it couples to the base 314) that engage a driving gear driven by an effector actuator 212. The end-effector actuator 212 may employ, for example, a brushless DC back-driveable motor to drive (i.e., rotate) a gear that engages the corresponding gear teeth of the two finger members 302 at their pivot points.

The shape of the end-effector 210 (e.g., the finger members 302) may be design to exploit the shape of a specific workpiece 214, which is illustrated as a rectangular prism, to minimize actuated degrees of freedom for the end-effector 210. For example, as illustrated, the finger members 302 are shaped to correspond with the lengthwise sides of the workpiece 214 where the tips bend inward to prevent the workpiece 214 from sliding outward (i.e., away from the base 314). In certain aspects, the finger members 302 may include pivoting joints along their length to provide fully articulating finger members.

The contact surfaces between the finger members 302 and the workpiece 214 may further be shaped to increase friction/engagement. For example, the workpiece 214 may include one or more protrusions (or recesses) to mate with corresponding recesses (or protrusions) on the end-effector 210 (e.g., the finger members 302 or the base 314.). The finger members 302 may be padded or provided with a high-friction surface (e.g., rubber) to enhance their grip on a given workpiece 214. The finger members 302 may further include electromagnets to selectively bond with the workpiece 214.

In certain aspects, the end-effectors 210 may be interchangeable. To that end, a quick connect device may be provided at a distal end of the arm boom 206 to physically and communicatively engage a corresponding quick connect device positioned on the base 314 of the end-effector 210. To that end, the quick connect device may provide two mating parts, a master-side and a tool-side designed to lock or couple together, carry a payload, and have the ability to pass utilities such as electrical signals, pneumatic, water, etc. Accordingly, via the quick connect device, an operator would be enabled to interchange quickly replace the type of end-effector 210 installed upon the arm boom 206.

Sensing within the end-effector 210 may be necessary to provide millimeter accuracy position and orientation with respect to the workpiece 214. Therefore, for optimal grasping contact with the workpiece 214, the end-effector 210 may provide sensor feedback to the workpiece manipulation system 114 (e.g., the workpiece manipulation processor 402) to adjust orientation of the lifting mechanism 204. For example, the end-effector's 210 sense of touch, coupled with distance sensors, can help both the workpiece manipulation system 114 and the UAV 100 to orient the end-effector 210 with regard to the workpiece 214, and to ensure that the workpiece 214 is securely grasped. Accordingly, in addition to an end-effector actuator 212 to open/close the two finger members 302 selectively, the end-effector 210 may include an optical module 304 and other feedback sensors to provide feedback to the UAV 100 about the workpiece 214 and an environment adjacent or near the workpiece 214.

The optical module 304 may include, for example, a first infrared (IR) camera 306, a RGB (red/green/blue) camera 308, an IR laser projector 310, a second IR camera 312, etc. The optical module 304 may be position toward the back of the end-effector 210 (e.g., on the base 314) and configured with a forward field of view to capture images of the workpiece 214 and environment. The optical module 304 may employ one or more sensing technologies to achieve depth perception, 3D imaging, interior mapping, and feature tracking. The first and second IR cameras 306, 312, together with the IR laser projector 310, provide depth information to calculate a spatial relationship between end-effector 210 and the workpiece 214. To that end, the first IR camera 306 and second IR camera 312 may be spaced apart from one another to capture different views (i.e., angles) of the workpiece 214 and environment. Using this data, the workpiece manipulation system 114 (via its workpiece manipulation processor 402) can measure the 3-D location of the workpiece 214 with respect to the end-effector 210 to a resolution within 1 mm.

Other feedback sensors may include, for example, pressure transducers, touch sensors, etc. Touch sensing is used to facilitate impedance control of the lifting mechanism 204 and can be achieved using pressure sensors embedded in cast rubber. For example, one or more pressure sensors may be positioned on an underside surface of the end-effector 210 to contact the stable surface 216 on approach to the workpiece 214. For example, tactile sensors (e.g., pressure transducers or strain gauges) may be placed on one or more of the finger elements 302, the base of the end-effector 210 on the front surface (where sensors could sense contact forces on finger members 302) or on the bottom surface (where base 314 would contact the ground); or at member 206. Additionally, the motors (which may be position in the base 314) that drive gears 304 could be used to perform tactile feedback through current sensing in the motor circuit. The workpiece manipulation system 114 can use information from the optical module 304 to plan a "coarse" approach route to move the end-effector 210 quickly and its touch sensors towards the end-effector 210 within a few millimeters of the workpiece 214.

The workpiece manipulation system 114 may further employ barcodes (e.g., positioned on the workpiece 214) to identify the workpiece 214 via the RGB camera 308. Multiple fiducial markers (e.g., April tags or ARtags) on the end-effector 210 (e.g., the finger members 302) can aid in the determination of the exact position of the end-effector 210. The workpiece manipulation processor 402, via the optical module 304, is configured to track the plurality of fiducial markers.

While the end-effector 210 is illustrated as a gripper-shaped active gripper with two finger members 302, other forms of grippers are contemplated to provide a desired grip force, such as pinching, entrapment, capture, and vacuum suction. To that end, other end-effectors may be coupled to the arm boom 206 to engage a workpiece 214. Indeed, the end-effector 210 may be an active or a passive end-effector. In some examples, the end-effector 210 may use active actuation in the end-effector (FIG. 3). In some examples, the end-effector 210 may use passive mechanisms that self-align with a specific workpiece. Additionally, an end-effector may use active sensing to align the end-effector attachments and workpiece carefully, or the end-effector may rely on grippers which do not require extensive alignment or have self-aligning features. One example of an "active actuation" with "passive sensing" uses granular media. For example, where the shape of the workpiece 214 is unknown or inconsistent, the end-effector 210 may employ a flexible hollow sphere (or portion of a sphere) that is filled with a granular material that can conform to the shape of the workpiece 214. Once the flexible hollow sphere conforms to the shape of the workpiece 214, a vacuum is used to remove air from the flexible hollow sphere, which causes the granular material to hold its shape around the workpiece 214. Once the end-effector 210 is ready to release, the air is returned to the flexible hollow sphere to cause the granular material to loosen and the flexible hollow sphere returns to its original shape. U.S. Pat. No. 8,882,165, which issued on Nov. 11, 2011 to Hod Lipson et al. and titled "Gripping and releasing apparatus and method," describes an example passive-sensing universal gripper that includes a mass of granular material encased in an elastic membrane.

FIG. 3 illustrates an actively-actuated gripper (the fingers 302 are driven by geared motors within the base 314), but the fingers 302 also demonstrate some self-aligning features such that the end-effector 210 does not need to be perfectly aligned with the workpiece before closing its fingers to grasp the object. Note that self-alignment can be aided by the low-inertia and back drivable robot arm design. An example of a passive-actuation and passive-sensing is a rigid gripper that self-aligns with a rigid workpiece of known shape is illustrated in FIGS. 6a through 6d. For example, if the workpiece is a rigid cube with a lip on top-side, then the gripper may be driven by the UAV 100 into the workpiece, with an interface that slides underneath the lip and uses gravity to hold the workpiece in place on the gripper.

Figure 4:
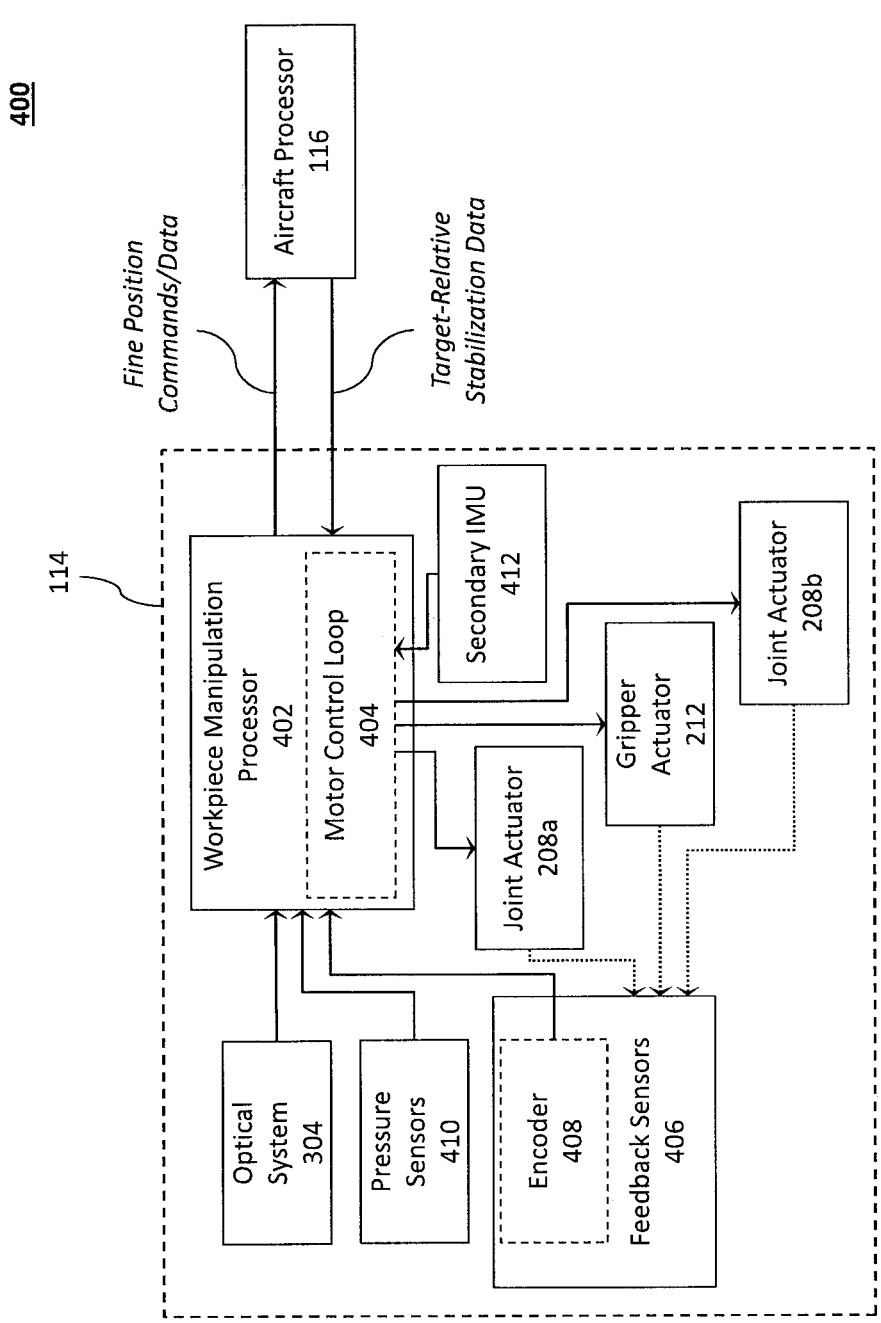
FIG. 4 illustrates an example diagram of an integrated architecture for the workpiece manipulation system.

FIG. 4 illustrates a diagram of an example integrated architecture 400 for the workpiece manipulation system 114. In operation, the UAV 100 is capable of coarse positioning, based at least in part on the indoor positioning system 132 (or ISR payload 126) and inputs from the on-board IMU 124c. Specifically, such inputs are used by the aircraft processor 116 for coarse stabilization. The workpiece manipulation system 114, however, provides additional inputs to the aircraft processor 116 of a similar type to the UAV 100 feedback laws, but at a finer resolution due in part to the higher-fidelity information that the workpiece manipulation processor 402 (e.g., a micro-controller) derives from other feedback sensors, such as target position sensing, pressure sensing, and joint position sensing. Therefore, the coarse positioning and attitude/rate inputs may be augmented by finer-scale inputs from the workpiece manipulation system 114.

Integration of the workpiece manipulation system 114 with the UAV's 100 can be facilitated using the workpiece manipulation processor 402, which is designed to both communicate with the aircraft processor 116 of the host UAV 100 and to control the operation of the workpiece manipulation system 114, including its various actuators (e.g., the first joint actuator 208a, the second joint actuator 208b, and the end-effector actuator 212). That is, each of the joint actuators 208a, 208b and end-effector actuator 212 may include, for example, a motor drive circuit that is controlled by the workpiece manipulation processor 402.

One or more feedback sensors 406 are configured to monitor the force and position of the first joint actuator 208a, the second joint actuator 208b, and the end-effector actuator 212. The one or more feedback sensors 406 may also include a current sensor to monitor current to the various actuators to determine a load. The output signals from one or more feedback sensors 406 may be encoded by the encoder 408 and provided as feedback to the workpiece manipulation processor 402 for using in, inter alia, a motor control loop 404. The encoder 408 may be attached to a rotating object (e.g., the motor or linkage joint) to measure rotation, which enables the workpiece manipulation processor 402 to determine displacement, velocity, acceleration, or the angle at a rotating sensor. Indeed, the encoder(s) 408 can be mounted at the actuator, or at the linkage joint itself. In some examples, the encoder(s) 408 may be rotational encoders attached to shafts and/or joints. The encoder(s) 408 may be optical, capacitive, inductive, and/or resistive. In some examples, joint velocity may be estimated by numerically differentiating the position signal. In some examples, "resolvers" (e.g., motors that emit a voltage as a function of their rotating speed) may be used to estimate joint velocity.

The workpiece manipulation processor 402 may also receive feedback from the other feedback sensors (e.g., one or more endpoint pressure sensors 410) and the optical module 304, which provides target position sensing data. The workpiece manipulation system 114 is therefore capable of providing: (1) tight inner-loop control for arm impedance control; (2) low-level feedback to the UAV 100 inner loops (attitudes and rates) to improve the accuracy of UAV 100 hover; and (3) higher-level commands to the aircraft processor 116 to command the UAV 100 to approach the workpiece 214. The integrated architecture 400 allows for high-bandwidth end-point control of the pick-and-place operation, with the UAV 100 treated as an element of the overall pick-and-place system.

A secondary IMU 412 may be provided to afford the workpiece manipulation system 114 with an additional 6-axis gyro and accelerometer combination to augment and compensate for any potential shortcomings in the UAV's 100 avionics, indoor positioning system 132, and navigation system 124. Accordingly, the workpiece manipulation processor 402 may also receive data from a redundant secondary IMU 412. The secondary IMU 412 may be positioned on, for example, the end-effector 210.

Figure 5A:
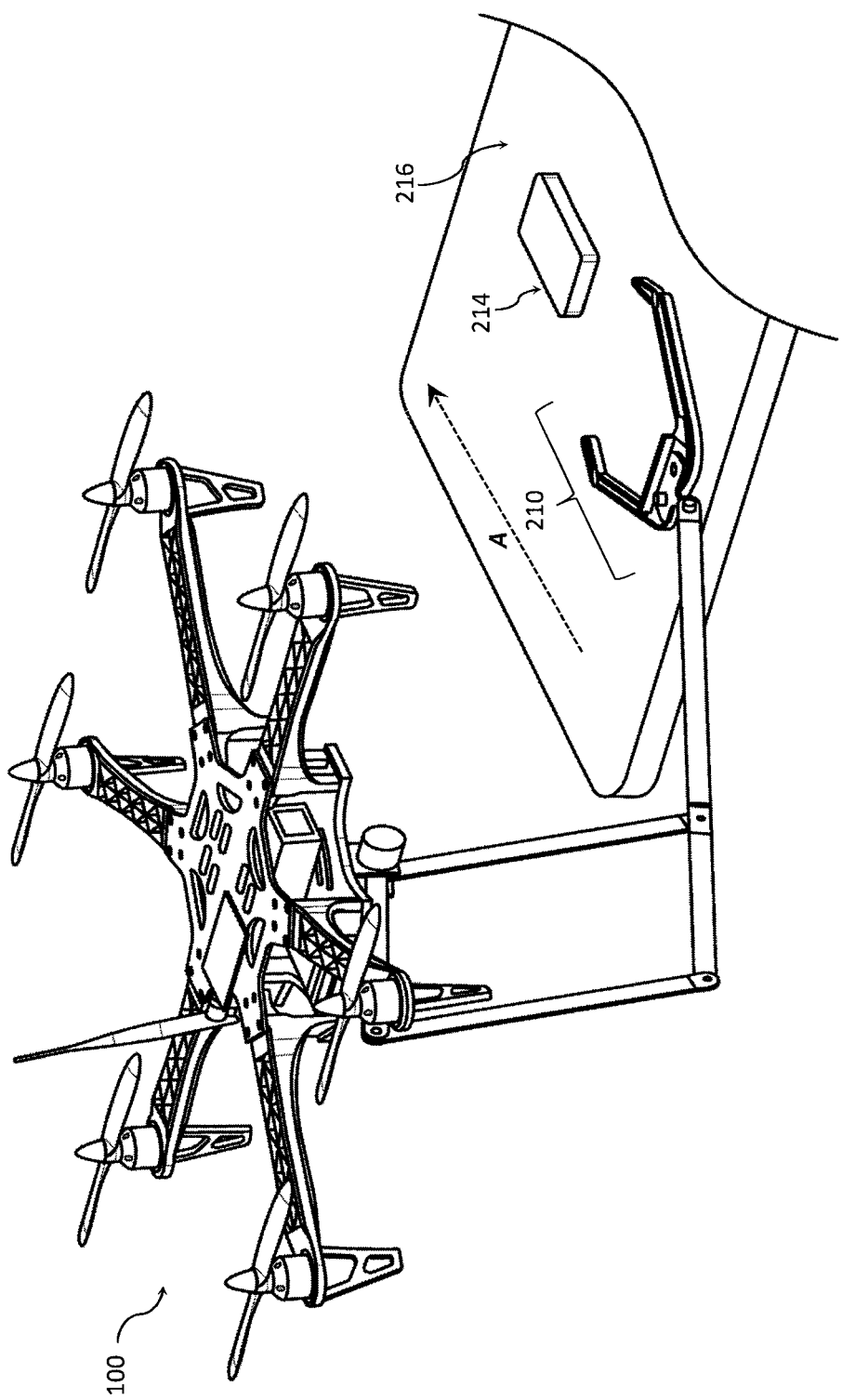
FIGS. 5a through 5c illustrate an example operation of the UAV as it travels toward, and grasps, a workpiece.
Figure 5B:
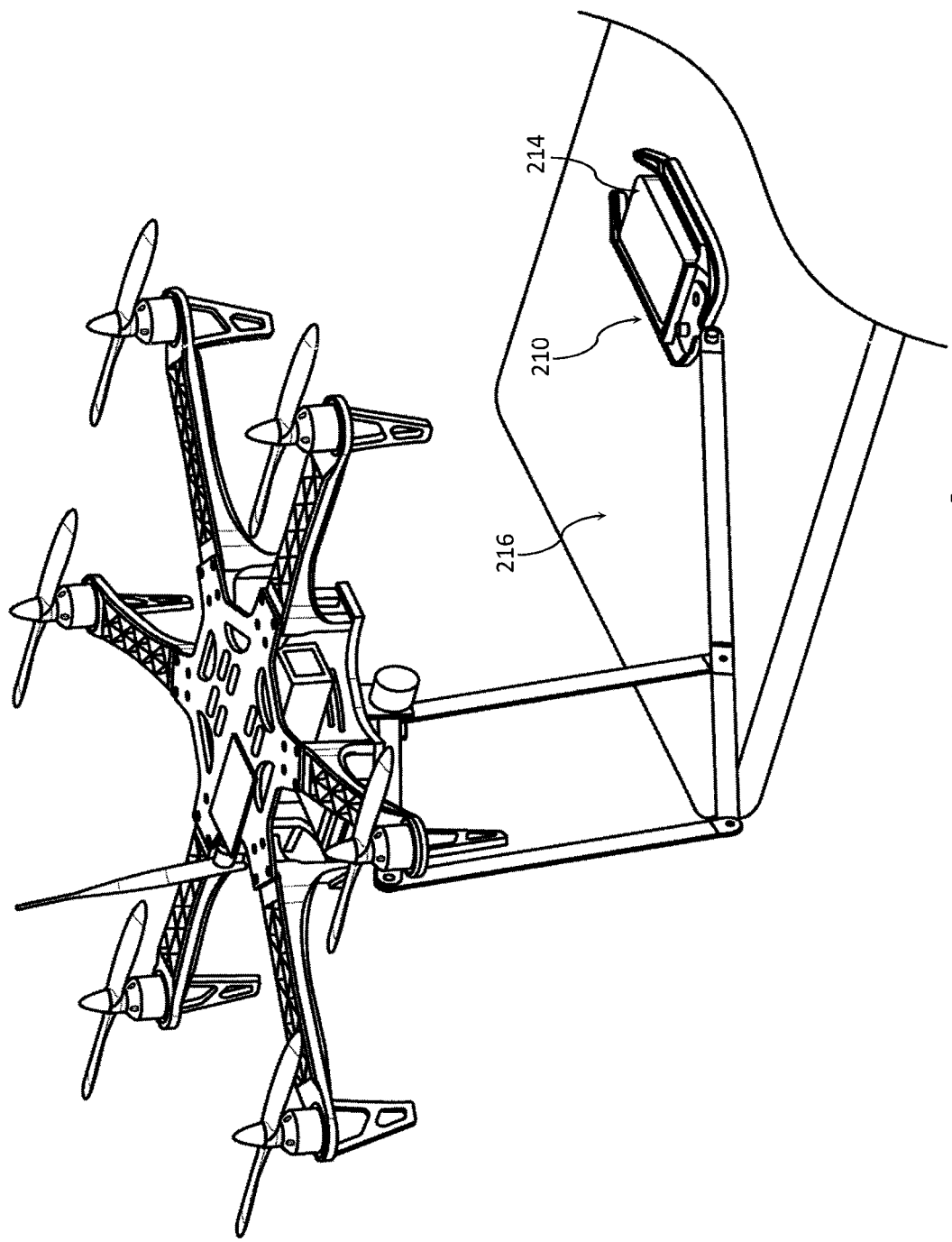
Figure 5C:
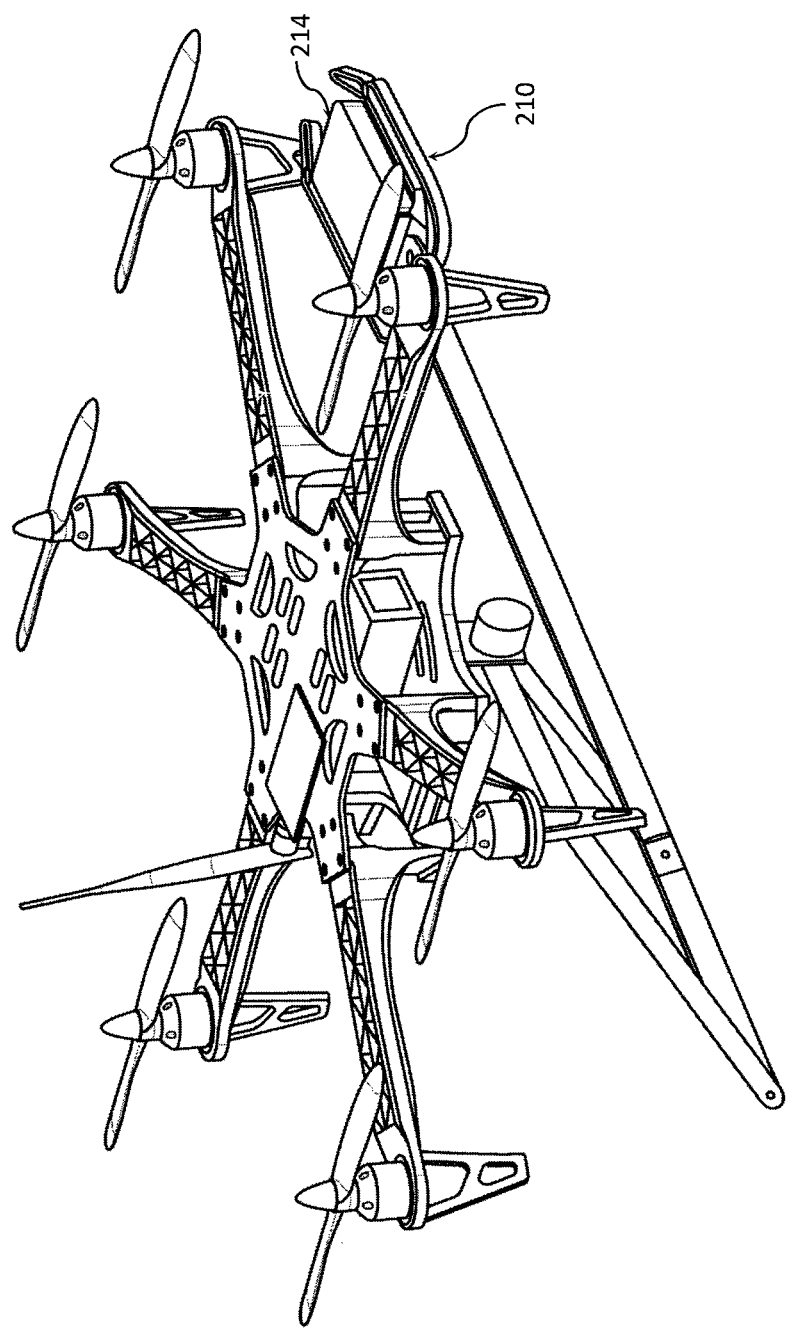

FIGS. 5a through 5c illustrate an example operation of the UAV 100 as it travels toward and grasps a workpiece 214. FIG. 5a illustrates the UAV 100 with the workpiece manipulation system 114 lowered to a deployed position from its stowed position, where the endpoint (e.g., the end-effector 210) is contacting the stable surface 216 at a touch-down point. As illustrated, the touchdown point is adjacent the workpiece 214. On approach to the target location, the UAV 100 does not need precise localization because the arm boom 206 lowers until the end-effector 210 contacts a solid stable surface 216 near the target workpiece 214. Touch sensors on the bottom of the end-effector 210 provide closed loop feedback for UAV 100, keeping it vertically stable. The optical module 304 identifies the location of the workpiece 214 and any obstacles in relation to the UAV 100.

The UAV 100 uses the stable surface 216 to slide the end-effector 210 as it travels toward the workpiece 214 (identified as Direction A) to perform millimeter-accurate pick-up operation. The UAV 100 travels toward the workpiece 214 until it is within the end-effector's 210 envelope. While the stable surface 216 is illustrate as large with initial touch-down point being relatively far from the workpiece 214, the endpoint can be configured to touch down within a short distance (e.g., a 2-10 centimeters, or directly on top) of the workpiece 214 using, inter alia, visual positioning and AR Tags. In this example, the UAV 100 uses a horizontal stable surface 216 to orient itself, but any stable surface 216 in any orientation could be used, such as a vertical wall near the workpiece 214. The workpiece 214 itself could also be used as the stable surface 216 if it is properly constrained.

As illustrated in FIG. 5b, once the workpiece 214 is within the end-effector's 210 envelope, the end-effector actuator 212 closes the finger members 302 around the workpiece 214. Touch sensors on the end-effector 210 (e.g., the finger members 302) provide feedback to the workpiece manipulation processor 402 to ensure a secure grip is established with the workpiece 214. Contact between the end-effector 210 (via the lifting mechanism 204) and the stable surface 216 will aid flight stability as the UAV 100 captures the workpiece 214 and prepares to fly away. As illustrated in FIG. 5c, the UAV 100 stows the lifting mechanism 204 and the workpiece 214 into transport position, adjusting the arm relative to system center of gravity to provide the most efficient flight dynamics. The lifting mechanism 204 may also be used to stabilize the workpiece 214 during flight.

FIGS. 6a through 6e illustrate another example end-effector 600 than can serve as end-effector 210. In some examples, the end-effector 600 may be provided with a depth camera and/or one or more touch sensors to measure relative orientation of the end-effector 600 vis-à-vis a workpiece 214, similar to the end-effector 210. Information from the one or more sensors reflecting, for example, the workpiece manipulation system's 114 kinematic state can be communicated to the aircraft processor 116 to provide information about the UAV's 100 precise position with respect to stable surfaces 216 and workpieces 214.

In some examples, the end-effector 600 may include a base 602 coupled to parallel bars 604. The base 602 may include a seat 606 configured to fit an actuator 608. The actuator may weigh down an "ankle" portion of the end-effector 600 to some extent, thereby creating an unbalanced center of gravity. The actuator 608 may be configured to move a shaft 610 (e.g., a cylinder, shaft, or other linkage to transfer/facilitate linear motion). The shaft 610 may be coupled to a gripper 612 such that movement of the shaft 610 moves the gripper 612. The gripper 612 may be coupled to the parallel bars 604 via links 614 such that movement of the gripper 612 via the shaft 610 will cause the links 614 to push and/or pull the gripper 612 opened and/or closed, so as to attempt to "pull in" a workpiece 214. Self-alignment of the gripper 612 and/or end-effector 600 may occur when the UAV 100 moves towards the workpiece 214—aided by proper mechanical impedance of the arm boom 206 and/or communication between the arm boom 206 and the UAV 100—and also when the end-effector 600 closes on (and/or "pulls in") the workpiece 214, causing the workpiece 214 to move relative to the gripper 612 and/or end-effector 600, and/or vice versa.

Like the end-effector 210, the end-effector 600 may be coupled to the lifting mechanism 204, such as via an arm boom 206, for example. In some examples, the end-effector 600 may include shoulders 616 configured to couple to the lifting mechanism 204 and/or arm boom 206. In some examples, the shoulders 616 may be raised, extended, and/or spaced above and/or away from the base 602. In some examples, the shoulders 616 may have apertures 618 positioned near apex points 620 of the shoulders 616. The apertures 618 may be circular and/or cylindrical. In some examples, the apertures 618 may be defined by walls of the shoulders 616. In some examples, the shoulders 616 may further comprise openings 622 below the apertures 618. The openings 622 may also be defined by the walls of the shoulders 616. In some examples, the openings 622 may be configured as trapezoids and/or trapezoidal prisms. In some examples, the openings 622 may have other shapes, such as rectangular, square, circular, oval, cubical, cylindrical, polyhedral, etc. The openings may provide a weight saving function that can be helpful for trimming the center of mass for an "ankle first" landing.

Figure 6A:
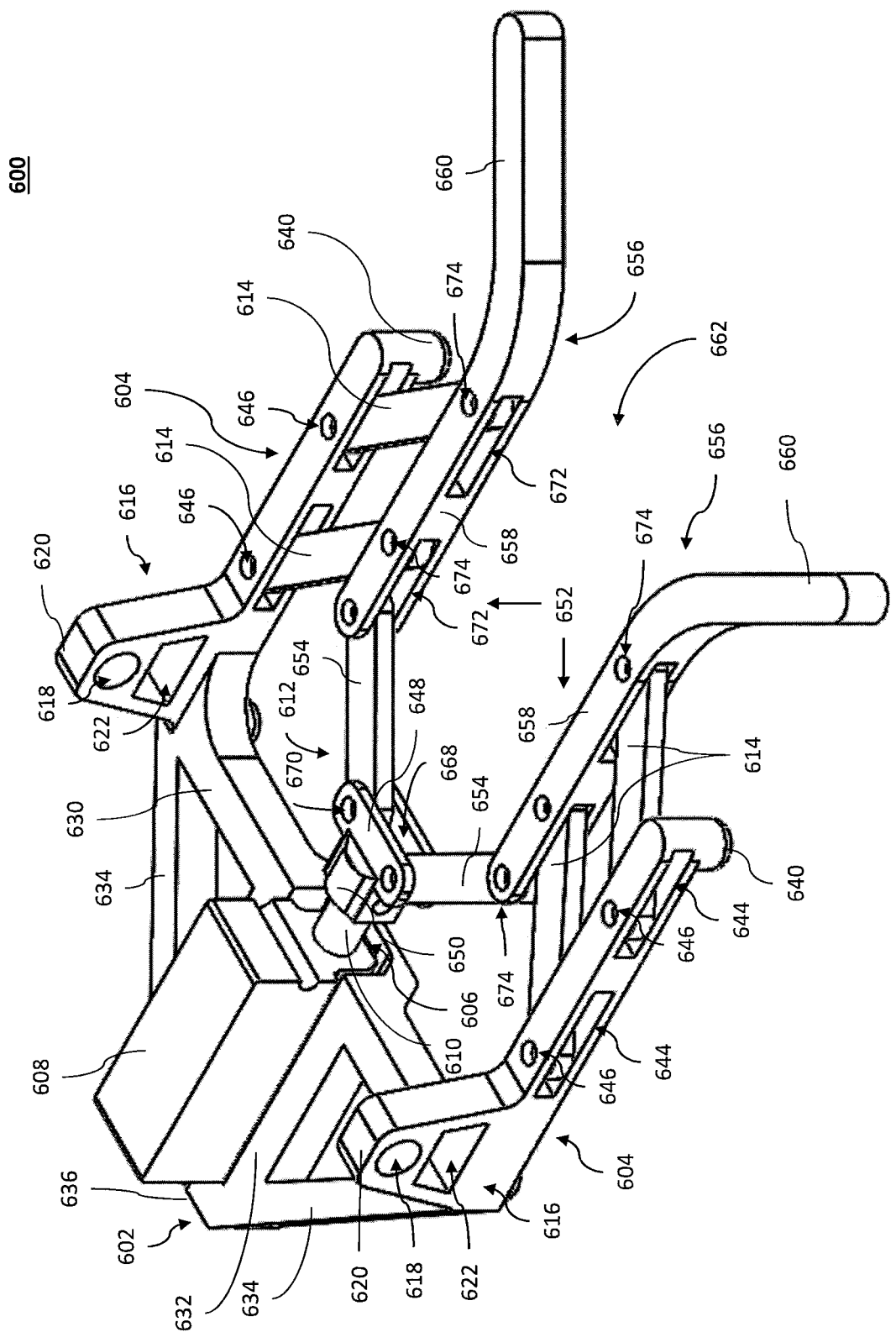
FIG. 6a illustrates a front perspective view of another example end-effector, according to an aspect of the present disclosure.
Figure 6C:
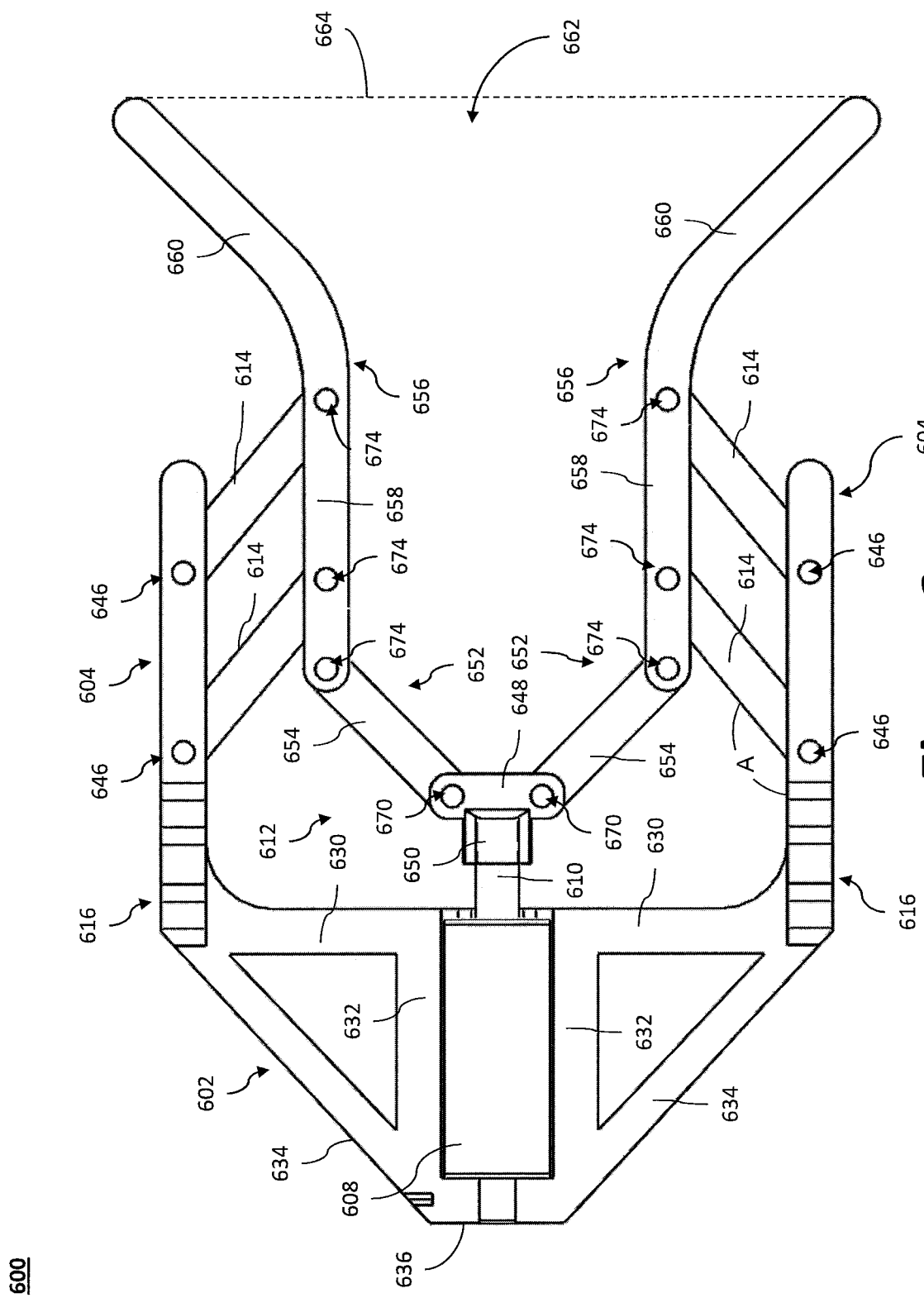
FIG. 6c illustrates a top view of the example end-effector of FIG. 6a, according to an aspect of the present disclosure.
Figure 6D:
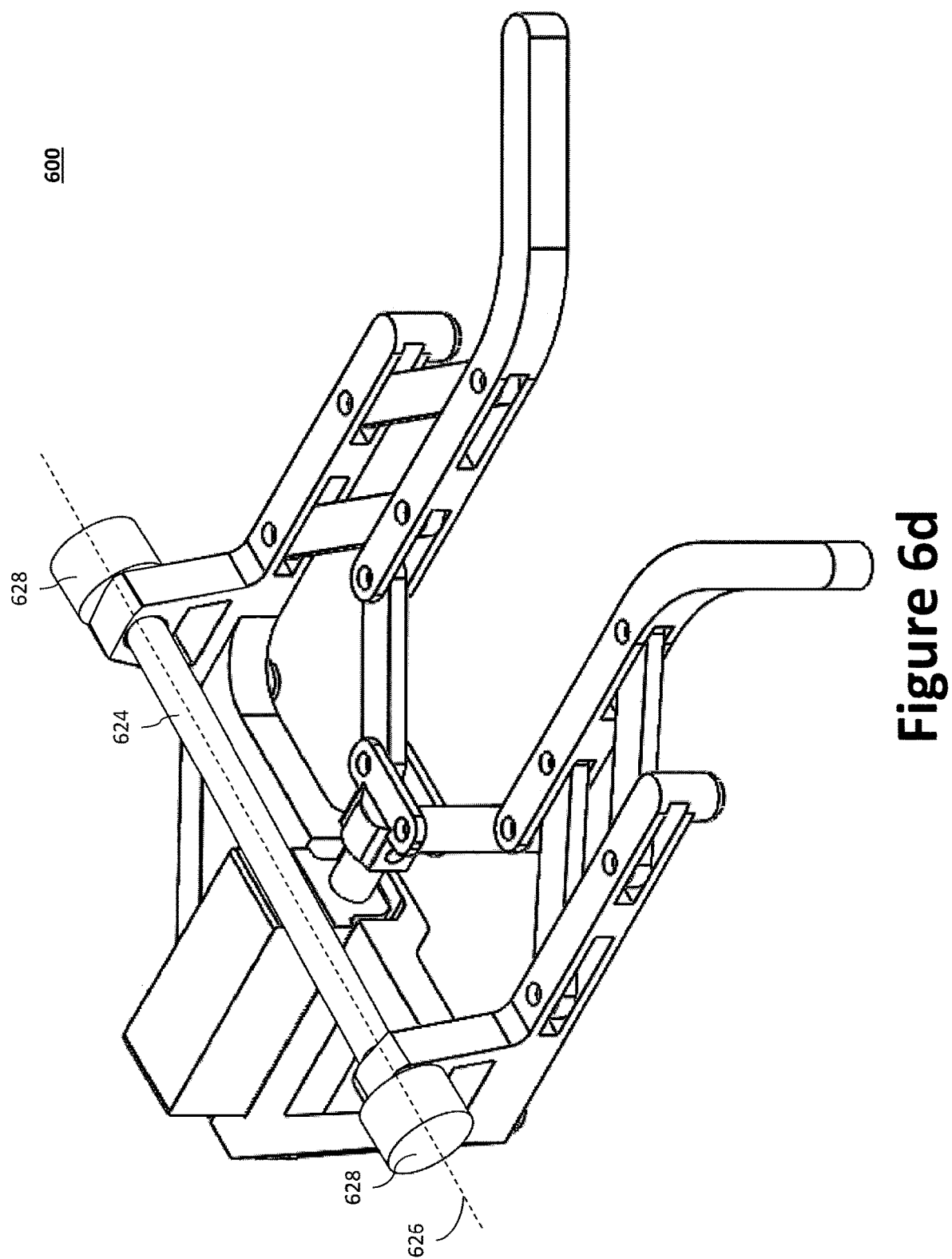
FIG. 6d illustrates a front perspective view of the example end-effector of FIG. 6a with a coupler, according to an aspect of the present disclosure.
Figure 6E:
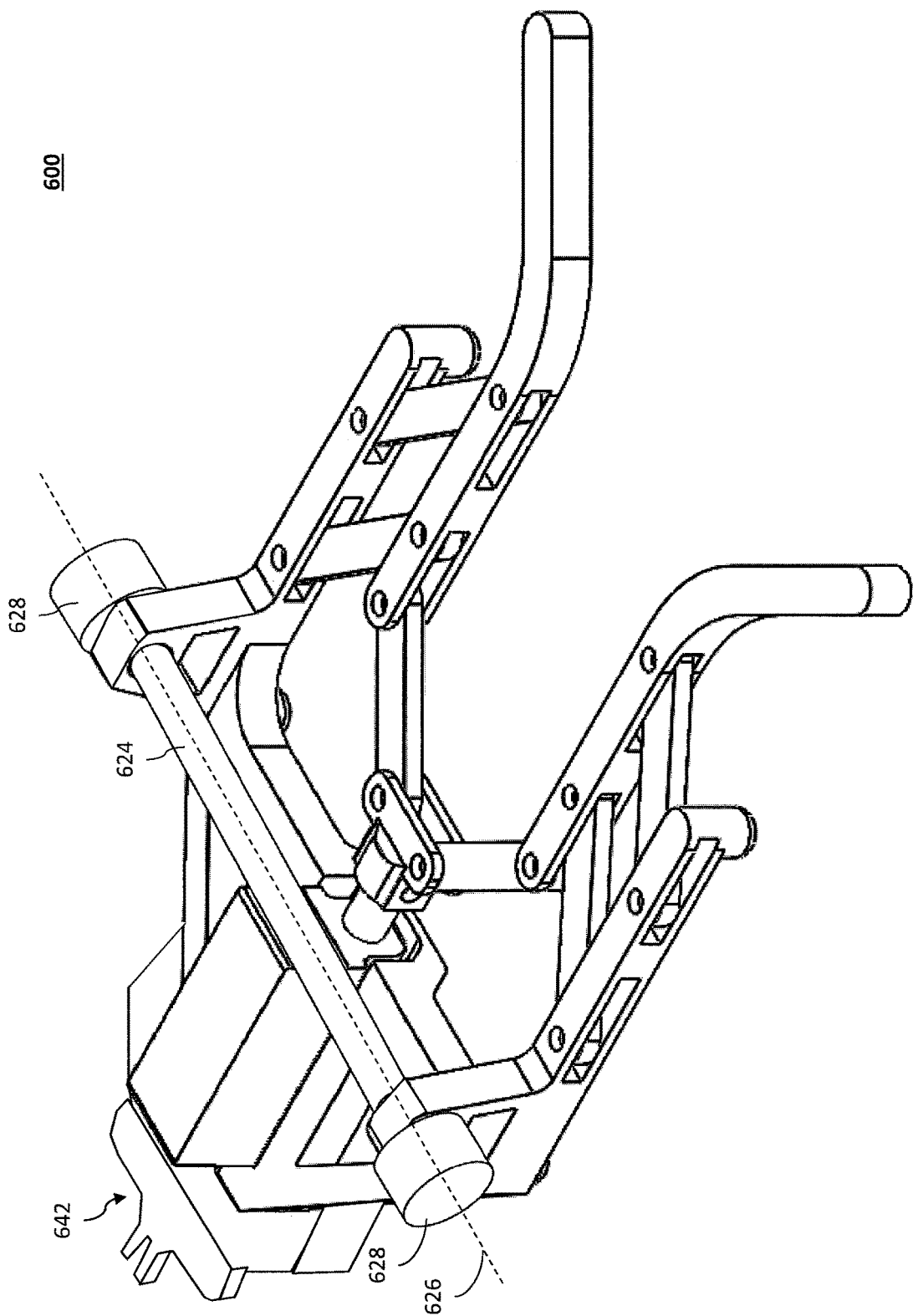
FIG. 6e illustrates a front perspective view of the example end-effector of FIG. 6a with a coupler and secondary coupler, according to an aspect of the present disclosure.

As shown in FIGS. 6d and 6e, for example, the apertures 618 and/or openings 622 may be configured to receive one or more couplers 624. The one or more couplers 624 may be connected to the lifting mechanism 204 and/or arm boom 206, either directly or through one or more intermediate linkages (not shown). The one or more couplers 624 may be coupled to one or more joint actuators 628 (e.g., similar to the joint actuators 208) so as to enable pivoting and/or rotatable movement of the end-effector 600 about an axis 626 of the one or more couplers 624. The joint actuators 628 may be controlled by (and/or operatively coupled to) the workpiece manipulation processor 402 and/or the aircraft processor 116. In some examples, no joint actuators 628 may be necessary.

In some examples, such as shown in FIGS. 6d and 6e, for example, the one or more couplers 624 may comprise one or more beams that extend through both apertures 618 and/or openings 622. In some examples, the apertures 618 may be axially aligned, such that a shared axis 626 extends through a center of both apertures 618. In some examples, the one or more couplers 624 may share the same axis 626 with the apertures 618 such that the end-effector 600 may be pivoted about the shared axis 626 of the apertures 618 and/or coupler(s) 624. In some examples, the one or more couplers 624 may comprise multiple couplers (e.g., 2, 3, 4, 5, 6, etc.), with one or more couplers 624 for each aperture 618 and/or opening 622. In some examples, the couplers 624 may comprise bolts, screws, rods, pins, and/or other appropriate fasteners fit for the apertures 618 and/or openings 622.

In some examples, the shoulders 616 may be part of parallel bars 604 coupled to the base 602. Each parallel bar 604 may include bar slots 644. In some examples, each parallel bar 604 may include two bar slots 644. In some examples, there may be more or fewer bar slots 644 (e.g., 1, 3, 4, 5, etc.). One end of a link 614 is retained within each bar slot 644 at a bar joint 646. The bar joint 646 may be configured to allow the link 614 to pivot (and/or rotate) within the bar slot 644. The bar joint 646 may be positioned proximate an end of the bar slot 644 that is closer to the base 602. In this way, the link 614 may be provided some room to move within the bar slot 644. In particular, the link 614 may be provided some space between the bar joint 646 and an end of the bar slot 644 farther from the base 602 to move within. In some examples, the area may allow each link 614 to achieve an angle A of approximately 90 degrees to an angle of approximately 135 degrees, as measured from the respective parallel bar 604 on the side of the link 614 closer to the base 602 (as shown, for example, FIG. 6c). In some examples, each link 614 may be prevented from achieving an angle A of less than 90 degrees. In some examples, each link 614 may be able to achieve an angle of approximately 75 degrees to 145 degrees. In some examples, each link 614 may be substantially oblong (and/or oval, stadium, etc.) shaped, resembling a rectangular prism (and/or cube) with semi-circular rings at opposite ends.

The base 602 may be relatively triangle (and/or prism) shaped, with gaps in its structure. The base 602 may be comprised of a crossbeam 630, a center beam 632 that approximately perpendicularly bisects the crossbeam 630, and two slant beams 634 that connect at an angle with opposite ends of the crossbeam 630 and an endpoint 636 of the center beam 632. The beams may connect such that there are triangle (and/or prism) shaped spaces formed between the crossbeam 630, center beam 632, and slant beams 634.

The parallel bars 604 may be coupled to the base 602 at opposite ends of the crossbeam 630, near where the crossbeam 630 intersects the slant beams 634. The parallel bars 604 may extend substantially parallel to one another, and substantially perpendicular to the crossbeam 630. In some examples, the shoulders 616 may be positioned such that the axis 626 may extend over the crossbeam 630. The base 602 may connect with the parallel bars 604 such that the axis 626 of the apertures 618 (and/or coupler(s) 624) extends approximately parallel to the majority of the crossbeam 630.

The center beam 632 may have a floor 638 that is sunk below the lower portions of the slant beams 634 and/or crossbeam 630 (see, e.g., FIG. 6b). Feet 640 (and/or standoffs) attached to undersides of the base 602 and/or parallel legs 652 may be configured to keep the end-effector 600 (and/or the floor 638) raised above a stable surface 216 that the end-effector 600 (and/or feet 640) may contact (and/or sit on, move along, etc.). In some examples, a pair of feet 640 may be positioned at an end of each parallel bar 604. In some examples, a pair of feet 640 may be positioned proximate intersections of the parallel bars 604 and the base 602.

In some examples, a seat 606 may be formed in the center beam 632 and/or crossbeam 630. In some examples, the seat 606 may extend to the floor 638. The seat 606 may be configured to fit (and/or receive, accommodate, etc.) an actuator 608, such as a linear actuator for example. In some examples, the actuator 608 may be a micro linear actuator with an approximately one inch stroke and/or a pull force of 5-10 pounds. In some examples, the actuator 608 may have an approximately half inch stroke. In some examples, the actuator 608 may have an approximately 2 to 4 inch stroke. In some examples, the actuator may have a pull force of 3-5 pounds, or 10-15 pounds, and/or 5-15 pounds. In some examples, the actuator 608 may be motor driven, such as by a brushed direct current (DC) motor with a bidirectional pulse width modulated (PWM) control.

The actuator 608 may be configured to move a shaft 610 in a linear reciprocating motion, so as to extend and retract the shaft 610 relative to the actuator 608 and/or base 602. In some examples, the actuator 608 may be configured to move the shaft 610 only when provided with electrical power (though the actuator 608 may not have to move the shaft when provided with electrical power). In some examples, the actuator 608 may retain the last position of the shaft 610 even when not provided with electrical power. Thus, the actuator 608 may hold the shaft 610 substantially in place even when the actuator 608 is unpowered. In some examples the actuator 608 may have its own power source (e.g., a battery power source). In some examples, the actuator 608 may be electrically connected to one or more power sources of the UAV 100 and/or workpiece manipulation system 114.

The base 602 with the actuator 608 situated thereon (and/or therein) may be considered an "ankle" of the end-effector 600. In some examples, much of the end-effector 600 may be formed of a lightweight plastic material, such that a majority of the mass of the end-effector 600 may be attributed to the actuator 608. Thus, where the end-effector 600 is coupled to a flying UAV 100 (and/or the lifting mechanism 204 and/or arm boom 206 of the UAV 100) via a pivoting coupler 624 connection, the "ankle" of the end-effector 600 may be tilted (and/or biased) towards the ground by the heavier weight of the "ankle" relative to the rest of the end-effector 600. This may cause the end-effector 600 to land "ankle" first when lowered onto a stable surface 216 by the UAV 100.

In some examples, a secondary coupler 642 may be attached to the "ankle" of the base in order to prevent the "ankle" from tilting. For example, the secondary coupler 642 might attach to the base 602 proximate the endpoint 636 of the center beam 632, such as shown, for example, in FIG. 6e. In some examples, one end of the secondary coupler 642 may couple to portions of the center beam 632 and/or slant beams 634. The other end of the secondary coupler 642 may attach to the lifting mechanism 204 or to some other suspension system of the UAV 100. In some examples, the secondary coupler 642 may also have one or more joint actuators 628 configured to move the end-effector 600 about a joint of the secondary coupler 642. In some examples, the secondary coupler 642 may prevent the end-effector 600 from tilting while the end-effector 600 is in the stowed position. In some examples, the secondary coupler 642 may be uncoupled from the end-effector 600 and/or the UAV 100 (and/or lifting mechanism 204) when not in the stowed configuration, such as when the workpiece 214 is close enough that the end-effector 600 can be lowered via the lifting mechanism 204 to a stable surface 216.

The end-effector 600 may further include a gripper 612 coupled to the actuator 608 and/or the parallel bars 604. In some examples, the gripper 612 may be positioned substantially between the parallel bars 604. A hip 648 of the gripper 612 may be coupled to the shaft 610 of the actuator 608, such as through a connector 650. The hip 648 may extend substantially parallel to the crossbeam 630 and/or perpendicular to the parallel bars 604. The gripper 612 may additionally include two legs 652. Each leg 652 may include a limb 654 and a forelimb 656. Each forelimb 656 may include a stem portion 658 and a mouth portion 660.

A gripping area 662 may be defined by and/or within the gripper 612. For example, as shown in FIG. 6c, the gripping area 662 may be considered the area between the legs 652 and bounded by the hip 648 and a line 664 connecting ends of the mouth portions of the forelimbs 656. The gripping area 662 may be funnel shaped, with the mouth of the funnel defined by the mouth portions 660 of the forelimbs 656, and the stem of the funnel defined by the stem portions 658 of the forelimb 656.

The gripper 612 may be coupled to the parallel bars 604 via links 614 such that movement of the gripper 612 via the shaft 610 may cause the links 614 to push and/or pull the gripper 612 opened and/or closed, so as to attempt to "pull in" a workpiece 214. "Opening" the gripper 612 may comprise expanding the gripping area, while "closing" the gripping area may comprise contracting the gripping area 662. Repeated cycles of opening and closing of the gripper 612 may allow the end-effector 600 to iteratively "funnel" the workpiece 214 farther within the gripping area 662 (and/or grasp) of the gripper 612.

A hip 648 of the gripper 612 may be coupled to legs 652 of the gripper 612. More particularly, the hip 648 may include a hip slot 668 along all or most of its length within which the two legs 652 may be coupled to the hip 648 at hip joints 670. More particularly, the limb 654 portions of the legs 652 may be coupled to the hip 648 at the hip joints 670. Still more particularly, one end of each limb 654 may be coupled to the hip 648 at the hip joints 670. The hip joints 670 may be configured to allow for pivoting (and/or rotatable) movement of the limbs 654 about the hip joints 670. Each limb 654 may be substantially oblong (and/or oval, stadium, etc.) shaped, resembling a rectangular prism (and/or cube) with semi-circular rings at opposite ends. Each limb 654 may have an end that is pivotally (and/or rotatably) connected to a forelimb 656 at a hip joint 670. The opposite end of the limbs 654 may be positioned within leg slots 672 of the stem portions 658 of the forelimbs 656. An end of the links 614 may also be positioned within the leg slots 672. The end of the links 614 may be retained within the leg slots 672 by a pivotable (and/or rotatable) leg joint 674 connection. The opposite end of the links 614 may be retained at bar joints 646 within bar slots 644.

The stem portions 658 of the forelimbs 656 may extend substantially parallel to one another. The stem portions 658 may include leg slots 672 having links 614 within. The links 614 may have ends retained by pivotable (and/or rotatable) leg joint 674 connections. In some examples, each stem portion 658 may comprise two leg slots 672 and two link 614 connections (one per slot 672). In some examples, each stem portion 658 may have one leg slot 672 with two or more link 614 connections for that one slot, or two leg slots 672 with two or more link 614 connections per slot 672. In some examples, each stem portion 658 may have one to four leg slots 672 with one to four links 614 connected within each leg slot 672. The forelimbs 656 may further include mouth portions 660 that flare and extend away from one another to form mouth portions of the funnel shaped gripping area 662.

In some examples, the links 614 may be configured to "push" the legs 652 (and/or limbs 654) of the gripper 612 closed (and/or closer together) when the shaft 610 is retracted, so as to contract (and/or close, constrict, etc.) the gripping area 662. In some examples, the links 614 may be configured to "pull" the legs 652 (and/or limbs 654) of the gripper 612 open (and/or farther apart) when the shaft 610 is extended, so as to expand (and/or enlarge) the gripping area 662. In some examples, each of the joints 646, 670, 674 may have an axis of rotation substantially perpendicular to the parallel bars 604, links 614, hip 648, limbs 654, and/or forelimbs 656, so as to enable this expanding and contracting of the gripper 612 and/or gripping area 662.

In some examples, one or both of the legs 652 may be provided with additional features to increase and/or enhance grip (and/or friction, traction, engagement, etc.). For example, legs 652 may be shaped and/or formed with bumps, knurling, protrusions, recesses, and/or other textured surfaces. In some examples, grip improving material may be placed over the legs to improve grip (and/or friction, traction, engagement etc.). For example, the legs 652 may be padded and/or provided with foam tape, foam rubber, grip tape, and/or other grip improving material to improve grip (and/or friction, traction, engagement etc.) and/or allow for conforming against uneven target surfaces. In some examples, the grip improving material may be applied to portions of the legs closest to the gripping area 662. For example, portions of the limbs 654 and/or forelimbs 656 closest to the gripping area 662 may be covered with grip improving material. This may have the added benefit of covering all or some of leg slot 672 openings, so as to reduce obstruction and/or contamination of the leg slots 672. In some examples, the legs 652 may be fitted with electromagnets to selectively bond with the workpiece 214.

In operation, the UAV 100 may maneuver in the air with the end-effector 600 while in transit to the workpiece 214. While held in the air by the lifting mechanism 204, the "ankle" of the end-effector 600 may tilt towards the ground (and/or stable surface 216) about the axis 626 of the coupler 624 due to the weight of the actuator 608 relative to the rest of the end-effector 600. The other portion of the end-effector 600 (i.e., the gripper 612 and/or parallel bars 604) may be tilted up in the air. In some examples, the secondary coupler 642 may prevent the tilting of the "ankle," such as, for example, while the end-effector 600 is in the stowed configuration and/or the UAV 100 is still a substantial distance from its destination. Once near the workpiece 214, the UAV 100 and/or lifting mechanism 204 may lower the end-effector 600 towards a stable surface 216. To the extent previously connected, the secondary coupler 642 may be removed, disconnected, and/or disengaged to allow the ankle of the end-effector 600 to tilt toward the ground. Thus, the end-effector 600 may be allowed to contact and/or land on the stable surface 216 ankle first.

The UAV 100 and/or lifting mechanism 204 may further maneuver the end-effector 600 along and/or across the stable surface 216 to bring it within sufficient proximity of the workpiece 214. In some examples, while maneuvering the end-effector 600 along the stable surface 216, the end-effector 600 may be held at such a height that the ankle continues to make primary contact with the stable surface 216, while the rest of the end-effector 600 is tilted in the air, out of contact with the stable surface 216. Once in sufficient proximity to the workpiece 214, the lifting mechanism 204 may lower the end-effector 600 such that all (or most) of the feet 640 are in contact with the stable surface 216.

Once in sufficient proximity to the workpiece 204 and in substantial in contact with the stable surface 216, the shaft 610 of the actuator 608 may be extended, so as to open the gripper 612 and/or expand the gripping area 662. The UAV 100 may try to maneuver the end-effector 600 such that the workpiece 214 is entirely, primarily, and/or at least somewhat within the gripping area 662. The UAV 100 may then command the actuator 608 to retract the shaft 610 (e.g., via the aircraft processor 116, and/or workpiece manipulation processor 402). The retraction may pull the hip 648 of the gripper 612 towards the base 602 and cause the limbs 654 and forelimbs 656 to be pulled towards the base 602 as well. The links 614 coupling the parallel bars 604 to the stems 658 of the forelimbs 656 may rotate to accommodate the movement of the gripper 612 being pulled towards the base 602 by the shaft 610. The rotational movement of the links 614 may cause the links 614 to extend farther into the gripping area 662, as the links 614 proceed towards a ninety degree orientation with respect to the parallel bars 604 and the forelimbs 656. The movement of the links 614 may push the forelimbs 656 inwards. The forelimbs 656 may be free to move inwards towards one another because of their pivotable coupling to the hip 648 via limbs 654. Thus, as the shaft 610 pulls the gripper 612 towards the base 602, the links 614 push the forelimbs 656 together, thereby constricting (and/or narrowing, compressing, contracting, etc.) the gripping area 662. This has the effect of both closing the gripper 612 (by constricting the gripping area 662) so as to tighten a grip on a workpiece 214 within the gripping area 662 while also "pulling" the gripper 612 and any workpiece 214 the gripper 612 may have grasped closer to the base 602, where it can be held more securely.

Figure 7A:
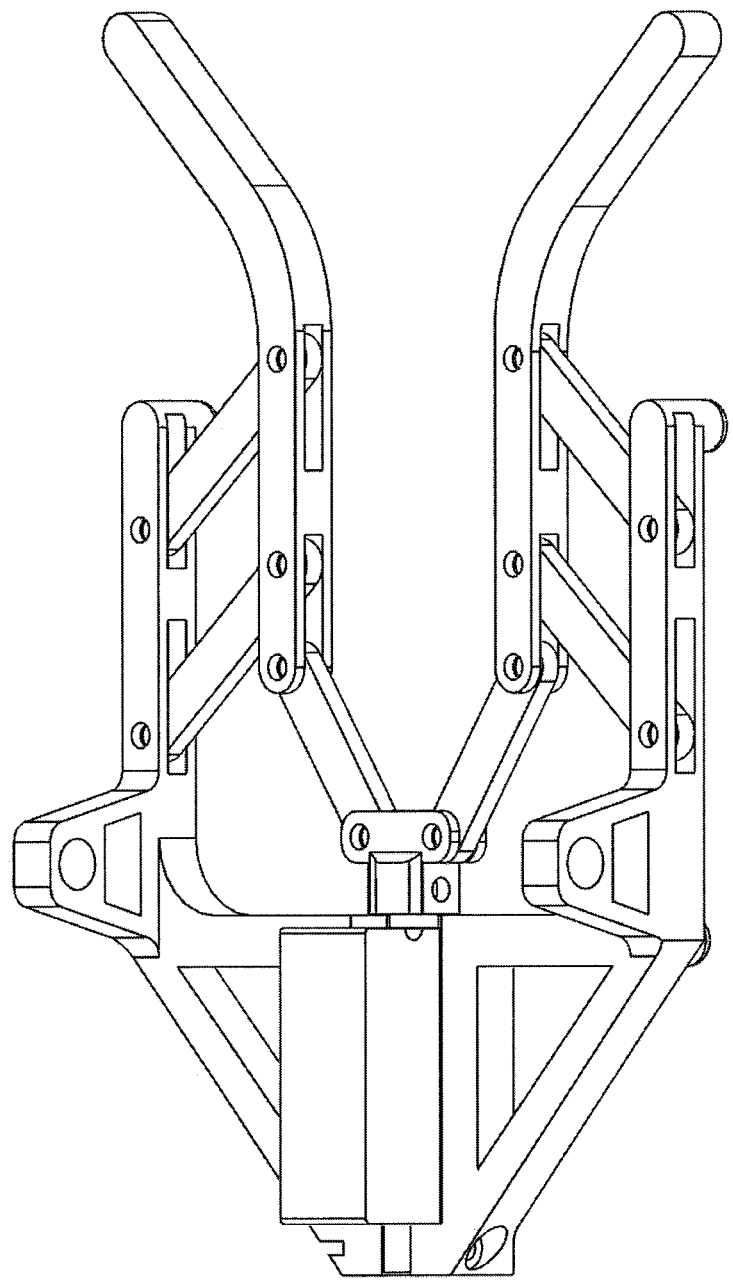
Figure 7B:
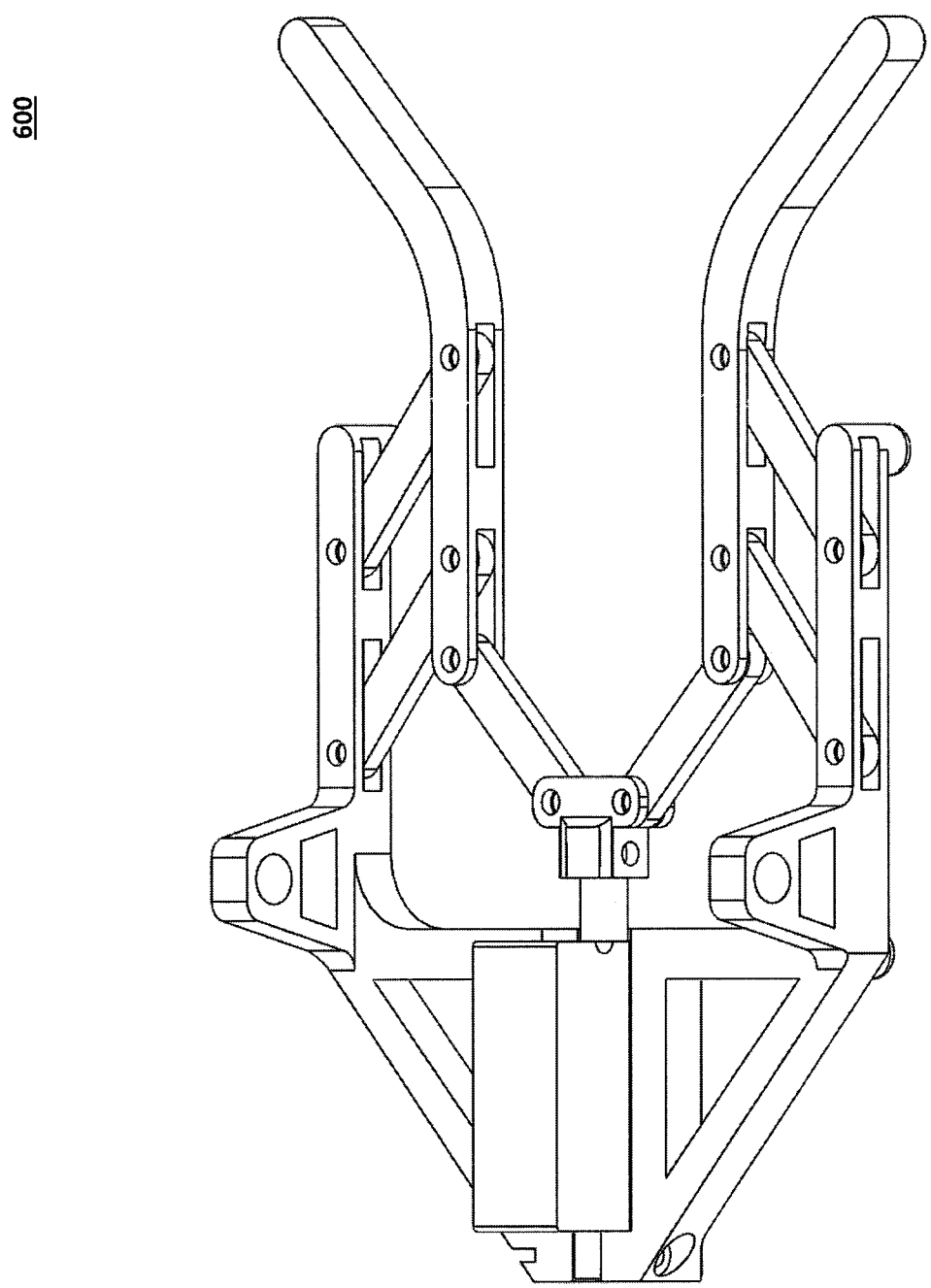

FIGS. 7a-7b illustrate movement of the griper 612 and/or end-effector 600 between a closed (and/or contracted, compressed, constricted) configuration and/or position, where the shaft 610 is fully retracted (e.g., FIG. 7a), and an open configuration and/or position, with the shaft 610 fully extended (e.g., FIG. 7c). FIG. 7b shows an intermediate configuration and/or position. Self-alignment of the gripper 612 and/or end-effector 600 may occur when the UAV 100 moves towards the workpiece 214—aided by proper mechanical impedance of the arm boom 206 and/or communication between the arm boom 206 and the UAV 100—and then closes on the workpiece 214, causing the workpiece 214 to move relative to the gripper 612 and/or end-effector 600, and/or vice versa.

The wider mouth portions 660 of the forelimb 656 further creates a larger gripping area 662 to help the gripper 612 contact, funnel, and/or partially grasp a workpiece 214 that is not entirely within the gripping area. By expanding (and/or opening, widening, etc.) and contracting (and/or closing, constricting etc.) the gripper 612 and/or gripping area 662, the gripper 612 may bring the workpiece 214 closer to the end-effector 600 and/or farther within the gripping area 662. In some examples, the expansion and contraction may move the gripper 612 closer to the workpiece 214, rather than vice versa. In some examples, the cycle of opening/expanding and contracting/closing may be repeated and/or iterated. The UAV 100 may make a determination as to if and when a workpiece 214 is sufficiently secured based on measurements of previously mentioned data collecting devices. In some examples, once the workpiece 214 is sufficiently secured within the gripper 612, no more power may need to supplied to the actuator 608 to retain the workpiece 214 within the grasp of the gripper 612. After the UAV 100 determines that the workpiece 214 is sufficiently secured within the gripper 612, the lifting mechanism 204 may move the end-effector 600 to the stowed position.

The end-effector 600 geometry may work well with a rectangular workpiece 214 of relatively consistent weight and balance. In some examples, the shape of the gripper 612 and/or legs 652 may be changed to accommodate other sized, shaped, weighted, and/or balanced workpieces. In some examples, the end-effector 600 may be interfaced with the UAV 100 such that unpredictable movements of the UAV 100 are not transmitted to the end-effector 600.

To provide around the clock operation (e.g., 24 hours a day, 7 days a week), the UAV 100 may be configured to provide continuous operation. However, UAVs 100 may be limited by their battery capacity. Nevertheless, continuous operation may be facilitated in multiple ways, including a tag team approach, a battery swapping approach, and/or an overhead tether system.

In a tag team approach, multiple UAVs 100 may be deployed, where one UAV 100 operates while the remaining UAVs 100 recharge their batteries. In some examples, one or more UAVs 100 may use the end-effector 600, while one or more other UAVs 100 use the end-effector 210. In some examples, all of the UAVs may use the end-effector 600. In some examples, all of the UAVs 100 may use the end-effector 210. As can be appreciated, the number of UAVs 100 needed in the tag team approach is a function of the operating time of the UAV 100 and the time needed to recharge the UAV 100. For example, if a UAV 100 can operate for 15 minutes before needing to recharge its batteries, and a recharge takes 75 minutes, six (6) UAVs 100 would be needed for continuous operation, each with its own charging station. The charging stations may be contact charging station or contactless charging stations (e.g., employing one or more inductive charging techniques). The tag team approach offers the advantage (with proper schedule management) of having several UAVs 100 simultaneously available to perform parallel tasks. However, the purchase cost of the overall system would be 6 times higher than for a single UAV 100 and operational and maintenance costs would increase. In a battery swapping approach, an operator (or robotic system) may be employed to: remove a spent battery pack from a UAV 100; replace it with a fresh battery pack; and place the spent battery pack in a charger. The battery swapping approach offers the advantage of obviating the need for several UAVs 100, but introduces the time expense for an operator to swap the battery packs and the complexity associated with a robotic battery-swapping system.

An overhead tether system would introduce a wire tether to enable continuous uninterrupted power to the UAV 100, and obviates the need for the battery, freeing up valuable lifting capacity and resulting in a much smaller UAV 100. A wire tether would also provide safer UAV 100 in the event of failure since the wire tether could be used to catch the UAV 100 if it veers off course or fails. However, a tether restricts the number of UAVs 100 that can operate in tandem or a swarm, and restricts each UAV's 100 movement. Where the UAVs 100 are operated with access to sunlight (or other equivalent light), one or more solar panels may be installed on the UAV 100 to extend battery life. Exemplary solar aircraft configurations and techniques are described by commonly owned U.S. Patent Publication Nos. 2017/0331323, which was filed May 12, 2017 and is titled "Solar Power System and Method Thereof," and 2016/0311545, which was filed Apr. 21, 2016 and is titled "Solar-Powered Aircraft."

It can be appreciated that aspects of the present disclosure may be implemented by hardware, software and/or a combination thereof. The software may be stored in a non-transitory machine-readable (e.g., computer-readable) storage medium, for example, an erasable or re-writable Read Only Memory (ROM), a memory, for example, a Random Access Memory (RAM, a memory chip, a memory device, or a memory Integrated Circuit (IC), or an optically or magnetically recordable non-transitory machine-readable, e.g., computer-readable, storage medium, e.g., a Compact Disk (CD), a Digital Versatile Disk (DVD), a magnetic disk, or a magnetic tape.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A workpiece manipulation system, comprising:
   an airframe having a controller;
   a lifting mechanism coupled to the airframe, wherein the lifting mechanism includes one or more joint actuators to extend or retract the lifting mechanism relative to the airframe;
   an end-effector coupled to the lifting mechanism, wherein the end-effector comprises:
      a base,
      an actuator positioned on the base, wherein the actuator is configured to move a shaft between an extended position and a retracted position, and
      a gripper coupled to the shaft, wherein the gripper comprises first and second legs, wherein the first and second legs are spaced to define a gripping area therebetween, and wherein movement of the shaft causes movement of the first and second legs to expand or contract the gripping area.

2. The workpiece manipulation system of claim 1, further comprising first and second parallel bars coupled to the base, wherein the first and second legs reside in substantially the same plane as the first and second parallel bars, wherein the first and second legs are positioned between the first and second parallel bars.

3. The workpiece manipulation system of claim 2, wherein the first and second parallel bars are coupled to one or more couplers, wherein the one or more couplers are coupled to the lifting mechanism.

4. The workpiece manipulation system of claim 2, wherein the first parallel bar includes a first shoulder having a first aperture and the second parallel bar includes a second shoulder having a second aperture that is axially aligned with the first aperture, and wherein a lifting mechanism is configured to couple to the end-effector via the first aperture and the second aperture.

5. The workpiece manipulation system of claim 1, further comprising a foot connected to an underside of the base to provide ground clearance for the end-effector.

6. The workpiece manipulation system of claim 1, further comprising a seat formed in the base, wherein the actuator is positioned within the seat.

7. The workpiece manipulation system of claim 1, wherein the actuator is configured move the shaft to change a position of the shaft when receiving power from a power source, and wherein the actuator is configured to maintain the position of the shaft when the actuator does not receive power from the power source.

8. The workpiece manipulation system of claim 1, wherein the gripper is coupled to the shaft at a hip, and wherein the hip is pivotally coupled to the first and second legs.

9. The workpiece manipulation system of claim 2, wherein the first leg comprises a first limb and a first forelimb pivotally coupled to one another at a first knee, and wherein the second leg comprises a second limb and a second forelimb pivotally coupled to one another at a second knee.

10. The workpiece manipulation system of claim 9, wherein each forelimb includes grip improving features to improve a grip of the forelimb.

11. The workpiece manipulation system of claim 9, wherein the first forelimb comprises a first stem portion and a first mouth portion, wherein the second forelimb comprises a second stem portion and a second mouth portion, wherein the first and second stem portions extend substantially parallel to one another and the first and second mouth portions extend away from each other, thereby defining a funnel shaped gripping area.

12. The workpiece manipulation system of claim 11, wherein the first stem portion is pivotally connected to the first parallel bar via a first link, wherein the second stem portion is pivotally connected to the second parallel bar via a second link.

13. The workpiece manipulation system of claim 12, wherein the first forelimb and the second forelimb are pushed towards each other by the first and second links when the shaft is retracted, thereby narrowing the gripping area between the first and second legs, and wherein the first forelimb and second forelimb are pulled away from each other by the first and second links when the shaft is extended, thereby widening the gripping area between the first and second legs.

14. The workpiece manipulation system of claim 1, wherein the controller is configured to control the actuator and to maneuver the end-effector within proximity of a workpiece via the lifting mechanism while using one or more impedance control techniques.

15. A method of manipulation configured for use with an aircraft comprising:
    identifying a workpiece;
    maneuvering an end-effector within proximity of the workpiece;
    opening, via an actuator coupled to a shaft, a gripper of the end-effector to expand a gripping area,
        wherein the gripper comprises first and second legs, wherein the first and second legs are spaced to define a gripping area therebetween, and
        wherein linear movement of the shaft is configured to move the first and second legs relative to one another to expand or contract the gripping area;
    maneuvering the gripper such that the workpiece is at least partially within the gripping area; and
    closing the gripper, via the actuator, to constrict the gripping area and grasp the workpiece.

16. The method of claim 15, wherein an aerial vehicle maneuvers the end-effector within proximity of the workpiece.

17. The method of claim 16, wherein the aerial vehicle retains the end-effector in a stowed position until the end-effector is in proximity of the workpiece.

18. The method of claim 16, wherein the end-effector is coupled to a lifting mechanism of the aerial vehicle, wherein the lifting mechanism is configured to lift and lower the end-effector.

19. The method of claim 15, wherein opening the end-effector comprises extending the shaft via the actuator, and wherein closing the end-effector comprises retracting the shaft via the actuator.

20. The method of claim 16, further comprising the step of filtering out motion of the aerial vehicle relative to the end-effector, wherein the end-effector is coupled to the aerial vehicle via a lifting mechanism configure to employ an impedance control technique.

* * * * *